United States Patent
Suda et al.

[11] Patent Number: 5,752,033
[45] Date of Patent: May 12, 1998

[54] PROGRAMMING DEVICE FOR PROGRAMMABLE CONTROLLER, FUNCTIONAL UNIT FOR PROGRAMMABLE CONTROLLER, AND METHOD OF INPUTTING MEMORY DISPLAY FOR PROGRAMMING DEVICE

[75] Inventors: Eiichi Suda; Takayuki Nihei; Kyoko Tanaka, all of Nagoya, Japan

[73] Assignee: Mitsubishi Denki Kabushiki Kaisha, Tokyo, Japan

[21] Appl. No.: 439,765

[22] Filed: May 12, 1995

[30]    Foreign Application Priority Data

May 26, 1994 [JP] Japan ................... 6-101373

[51] Int. Cl.$^6$ .................................. G06F 9/00
[52] U.S. Cl. ........................... 395/701; 395/704
[58] Field of Search ..................... 395/800, 701, 395/702, 704, 705; 364/188

[56]         References Cited

U.S. PATENT DOCUMENTS

| | | | |
|---|---|---|---|
| 4,663,704 | 5/1987 | Jones | 364/188 |
| 5,091,859 | 2/1992 | Zingher et al. | 364/471 |
| 5,142,469 | 8/1992 | Weisenborn | 364/146 |
| 5,353,307 | 10/1994 | Scharnhorst | 364/188 |

FOREIGN PATENT DOCUMENTS

| | | |
|---|---|---|
| 0352683 | 1/1990 | European Pat. Off. . |
| 0434288 | 6/1991 | European Pat. Off. . |
| 0525758 | 7/1992 | European Pat. Off. . |
| 1217507 | 8/1989 | Japan . |
| 212303 | 1/1990 | Japan . |
| 2054909 | 2/1991 | United Kingdom . |
| 2244573 | 3/1991 | United Kingdom . |
| 2244575 | 12/1991 | United Kingdom . |
| 2277999 | 11/1994 | United Kingdom . |
| 8906389 | 7/1989 | WIPO . |

*Primary Examiner*—Eric Coleman
*Attorney, Agent, or Firm*—Sugrue, Mion, Zinn, Macpeak & Seas, PLLC

[57]         ABSTRACT

A programming device for a programmable controller comprising a unit specification information table in which specifications of a functional unit are set, a unit configuration table in which combinations of functional units are set, and a program preparing means for assisting input of a program for a programmable controller according to various types of information in said unit specification information table and the unit configuration information table.

12 Claims, 31 Drawing Sheets

F I G. 1
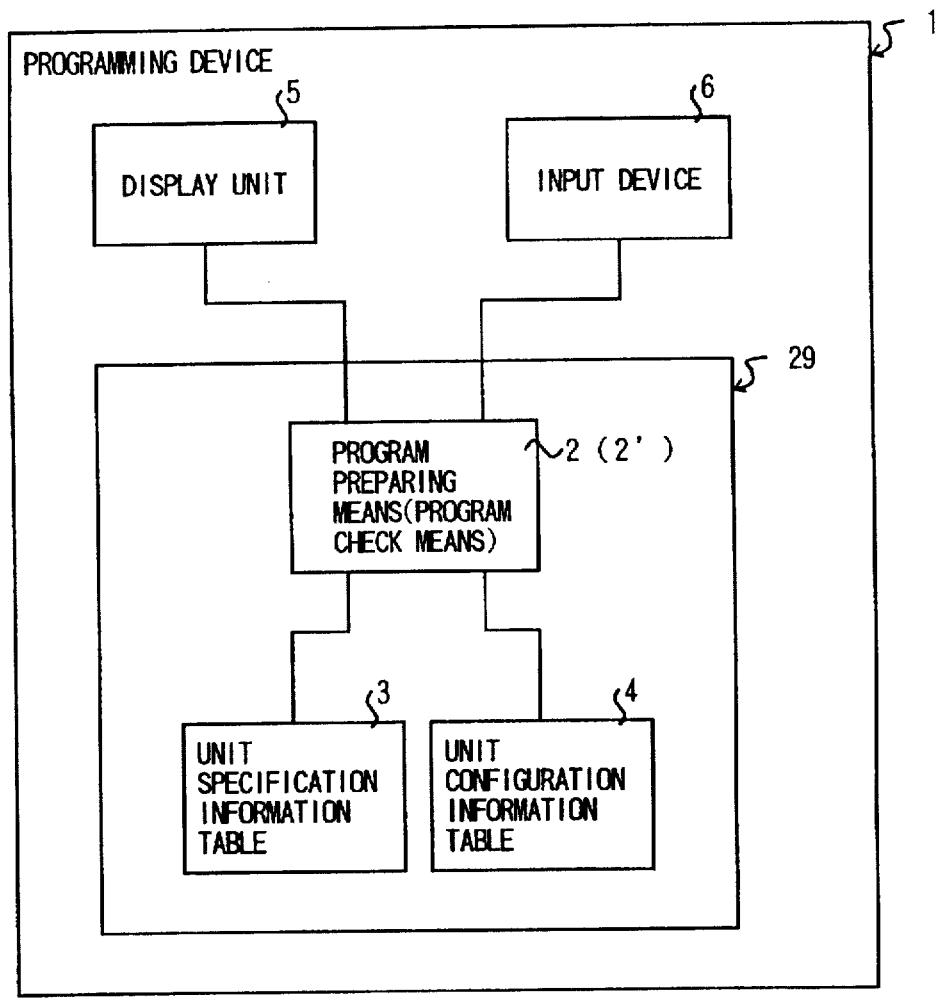

F I G. 3
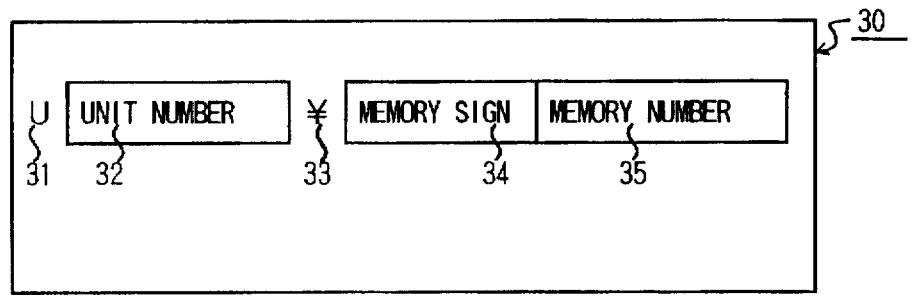
F I G. 4
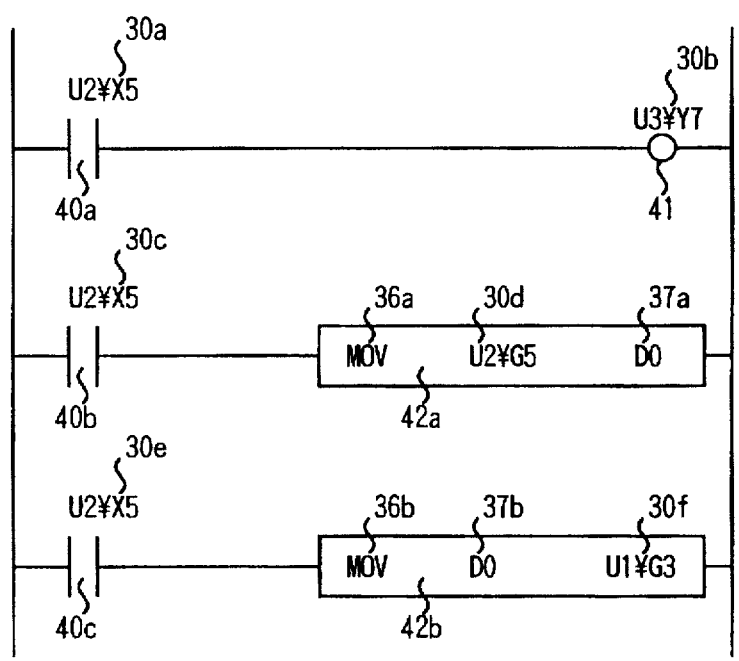

FIG. 5

| UNIT NAME | NUMBER OF BITS OF INPUT BIT MEMORY | NUMBER OF BITS OF OUTPUT BIT MEMORY | NUMBER OF WORDS OF WORD MEMORY |
|---|---|---|---|
| INPUT UNIT | 16 | 0 | 0 |
| OUTPUT UNIT | 0 | 16 | 0 |
| SPECIFIC FUNCTIONAL UNIT | 8 | 8 | 8 |

FIG. 6

| SLOT NUMBER | UNIT NAME |
|---|---|
| 0 | INPUT UNIT |
| 1 | INPUT UNIT |
| 2 | SPECIFIC FUNCTIONAL UNIT |
| 3 | OUTPUT UNIT |

FIG. 11
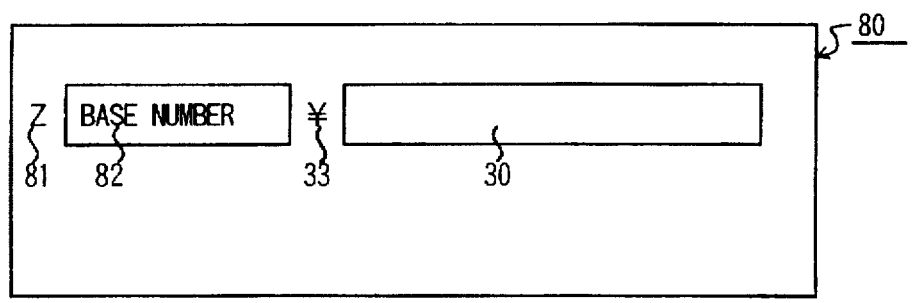
FIG. 12
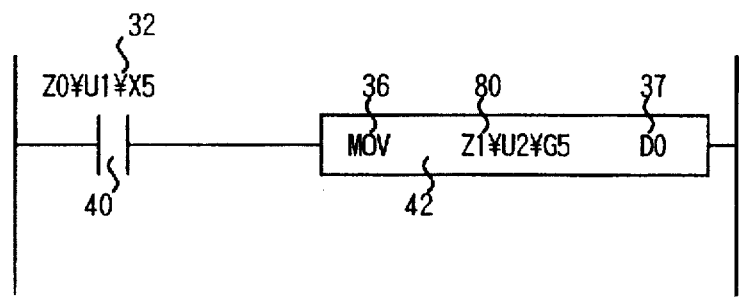
FIG. 13
| BASE NUMBER | NUMBER OF SLOTS |
|---|---|
| 0 | 4 |
| 1 | 8 |
| 2 | 4 |

FIG. 18
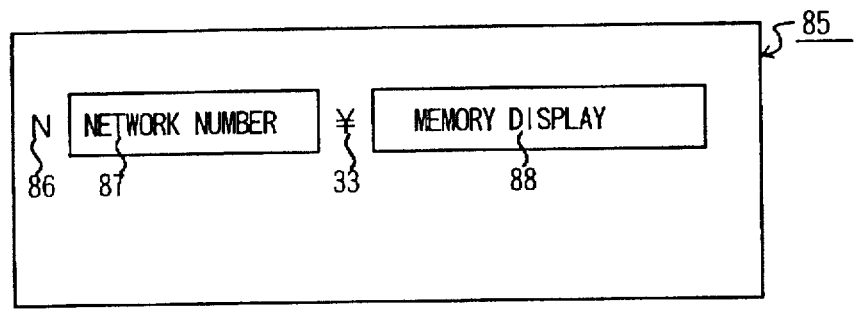
FIG. 19
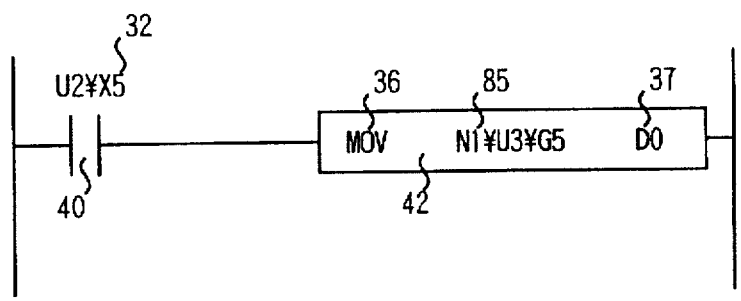
FIG. 20
| NETWORK | TYPE OF PC |
|---------|------------|
| 1 | LOCAL STATION |
| 2 | REMOTE STATION |

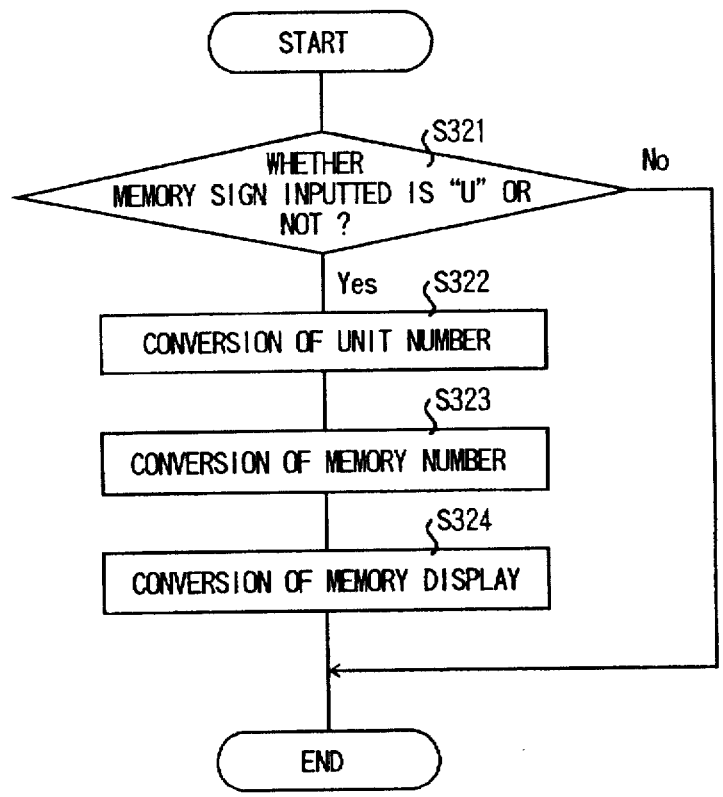

FIG. 28

| SLOT NUMBER ⌒60 | UNIT HEADER MEMORY NUMBER ⌒61 |
|---|---|
| 0 | 0 |
| 1 | 1 6 |
| 2 | 4 8 |
| 3 | 6 4 |
| 1 5 | 2 8 8 |

FIG. 29

| BASE NUMBER | BASE HEADER UNIT NUMBER |
|---|---|
| 0 | 0 |
| 1 | 4 |
| 2 | 1 2 |

| NETWORK NUMBER | NETWORK HEADER MEMORY NUMBER |
|---|---|
| 0 | 0 |
| 1 | 1 6 |
| 2 | 4 8 |

PROGRAMMING DEVICE FOR PROGRAMMABLE CONTROLLER, FUNCTIONAL UNIT FOR PROGRAMMABLE CONTROLLER, AND METHOD OF INPUTTING MEMORY DISPLAY FOR PROGRAMMING DEVICE

FIELD OF THE INVENTION

The present invention relates to a programming device for a building-block type programmable controller in which functional units for input, output and execution of specific controls are combined and used according to need under the control of a CPU unit and upon instruction from the CPU unit. The invention also relates to a function unit for a programmable controller, as well as to a method of inputting memory displays for a programmable controllers.

BACKGROUND OF THE INVENTION

During its early development, a programmable controller (called "PC" hereinafter) was constructed using various types of relay boards in combination. However, lately the scope of application for PCs has been substantially enlarged because of improved convenience in use of the operating program and enhanced flexibility, and also because the functions which PCs can perform have become extremely advanced and sophisticated. In association with progress in the field of programmable controllers, PCs can now exercise control over an object with a large number of inputs and outputs, not only with respect to sequence control, but also various types of other control operations such as analog control, positioning control, communications control, and control over monitor displays.

Sequence control is executed by input and output units (called I/O units hereinafter) primarily under the control of a CPU unit, which is one of the units constituting a PC. Control operations over analog devices other than sequence control operations are executed by specific functional units under the control of a CPU unit. Control by the CPU unit can be effected for general control over the entire system by writing data such as instructions to or reading data such as results of processing by the I/O units and specific functional units according to a sequence program (called simply a "program" hereinafter). (Hereinafter, the I/O units and the specific functional units are generically referred to as "functional units".)

Next, with reference to FIG. 38 to FIG. 43, a description is given of an example of a program executed by a programming device using a conventional basic system configuration.

An example of the system configuration of a PC is shown in FIG. 38. In this figure, designated by reference numeral 1 is a programming device for preparing a program for a PC. Usually, a personal computer or other device having equivalent functions is used for this component. The programming device 1 includes a display unit 5, which is a display unit for displaying programs or the like, an input device used for inputting programs or the like, and a basic system corresponding to the basic system of a personal computer. Also, designated at reference numeral 22 is a PC having a CPU unit and a functional units, at 10 a communications cable for exchanging data such as a sequence program or various types of control information between programming device 1 and PC 22, at 11 a CPU unit for controlling the functional unit according to a program, at 20 an internal memory for the CPU unit 11 used to store data concerning the state of execution of a program or control information, at 12a to 12d functional units which operate according to instructions from the CPU unit, at 21a to 21d an internal memory used to store data such as operating state or control information for the functional units 12a to 12d, at 14 a base unit in which the CPU unit 11 and the functional units 12a to 12d are incorporated, at 9a to 9d slots each used for connection of one of the functional units 12a to 12d to the base unit 14, and at 13 a bus for exchange of data or control information between the CPU unit 17 and the functional units 12a to 12d.

Reference numeral 110 in FIG. 39 indicates an example of a data format in an input or output bit memory, which is provided as a screen display on the programming device. In this figure, reference numeral 34 indicates a memory sign, while in the subsequent description the suffixed alphabetic character indicates a particular memory. Reference numeral 35 indicates a memory number indicating an address at which the contents of the memory is stored.

FIG. 42 is an example of a program based on the memory display format as described above. In this figure, designated by reference numerals 110a to 110d are bit memory displays for functional units, at 40a to 40c contact signs each indicating a contact, at 41 a coil sign indicating a coil, at 72a and 72b application commands, each for operating upon contents of a memory of a respective functional unit, at 32a and 32b units numbers each displaying a particular unit, at 35a and 35b memory numbers each indicating a particular memory in a function unit, at 37a and 37b memory displays each displaying a particular memory in the CPU unit, and at 42a and 42b application command signs each indicating an application command.

Next, a description is given of a display format of a memory inside a functional unit in the conventional programming device and a program. The conventional display format varies according to whether the memory is a bit memory or a word memory, and at first a description is given for a bit memory. In case of an input bit memory such as, for instance, a bit memory display 110a shown in FIG. 42, a No. 20 input bit memory is expressed as X20 with the character "X" as a memory sign. Also as in case of a bit memory display 110b, a No. 54 output bit memory is expressed as Y54 with the output bit memory as a memory sign of "Y".

Next, a description is given of a display number for a bit memory in a functional unit. A number is assigned to each bit memory in each functional unit progressively starting from the functional unit 12a closest to the CPU unit 111, so that bit memories are displayed systematically.

For instance, assuming that the number of bits for bit memories incorporated in each of the functional units 12a to 12d is 16, 32, 16, and 16 bits, respectively, and that the memory numbers start from 0, the header bit number of a bit memory in each of the functional units from 12a to 12d is No. 0, No. 16, No. 48, and No. 64 respectively.

An example of a program using a bit memory having the format described above is shown in the first line in FIG. 38, and an example of display on the display unit 5 is shown in the first line in FIG. 42. This program is prepared by means of key entry into the input device 6 shown in FIG. 38. For instance, an input of X20 indicating a bit memory is executed by pressing down the keys X, 2 and 0.

On the other hand, a different manner for expression from that for the bit memories is employed for the word memories inside the functional unit. As for the word memories, a dedicated application command is employed. An example of this application command is shown in line 2 and line 3 in FIG. 42. This program is prepared by means of key entry into the input device shown in FIG. 38, where, for instance, an input of the application command "FROM" 72a is executed by pressing down the keys F, R, O, M, SPACE, 2, SPACE, 5, SPACE D and 9. The application command "FROM" 72a is a command for reading data from a word memory in a functional unit. Reference numeral 32a in the "FROM" is the number of the slot in which the functional unit to be read is mounted. In this example the slot number is 2, and with the slot numbers starting from 0, slot number 2 indicates the functional unit 12c. The next reference number 35a indicates an address from the head of a word memory in a functional unit, and in this example it indicates the fifth memory. The last reference numeral 37a indicates a word memory in a CPU in which data read from a function unit is stored.

The application command "TO" 72b is a command for writing data in a word memory in a functional unit. Reference numerals 32b and 35b are instructions for word memories in the functional units in which data is to be written, wherein the input method and the meaning are the same as those of "FROM" above. Reference numeral 37b indicates a word memory in a CPU in which data to be written has been stored.

Next a description is given with reference to FIG. 40 for an example of a program for a conventional type of programming device in a case where, in addition to the basic system configuration for a PC as shown in FIG. 38, an extension base on which additional functional units are mounted is installed.

In FIG. 40, reference numeral 15 is an extension base on which functional units which cannot be accommodated on the base 14 are mounted. Otherwise, the arrangement is the same as in FIG. 38.

As shown in FIG. 40, physically the functional units 12e to 12h are mounted on an extension base 15 which is different from the base 14, but are directly electrically connected through a bus 13 to the base 14. Thus, also in case of displays for a programming unit, the header bit memory number in, for instance, the functional unit 12e, is No. 80, assuming that the final bit memory number 79 in the functional unit 12c. Also the slot number is 4 if the slot number in the functional unit 12c is 3.

Next, with reference to FIG. 41 and FIG. 42, a description is given for a program prepared by the conventional control unit which reads data from and writes data in a memory through a communications network.

FIG. 41 shows the system configuration of a PC in the case of network connection. In this figure, designated by reference numeral 16 is a master station which is a PC having a function of controlling a communications network, at 17 a local station having the same control function as that of the master station, except that the local station does not control a communications network, at 18 a remote station not having a CPU unit and which is controlled by the master station 16, and at 19 a communications network.

FIG. 43 shows a program in the master station 16 shown in FIG. 41. In this figure designated by reference numerals 84a, 84b are memory displays dedicated to a network which display memories dedicated to communication with other PC or PCs connected to the network, at 87a, 87b are network numbers each indicating another particular PC connected through the network, at 88a to 88b memory displays in a PC specified by the network sign. Other portions are the same as those shown in FIG. 38.

Memory displays for other PCs connected through a network are largely divided into the following two types. One is a display of bit memories as well as word memories dedicated to one network. Each PC incorporates bit memories and word memories dedicated to a respective network, and the memories are displayed systematically by allocating a number to a bit memory as well as to a word memory dedicated to each PC network starting from a PC having the lowest network number. The manner of assigning the memory number is the same as that of assigning memory numbers to bit memories in the functional unit, so that description thereof is omitted herein.

Another type is a display for specifying both network numbers of other PC and memory displays in the PC. This display is used in an application command dedicated to communications in a case where data is read from or written into memories in a PC other than those dedicated to the network. FIG. 43 is an example of a program in a case where data is transferred to and from another PC connected to the network. The application command "NFROM" 72c is a command for reading data from a memory in another PC. The reference number 87a in the "NFROM" above is a network number identifying the other PC on the network, and in this example it corresponds to the network number 1. The reference number 88a coming next identifies an internal memory in another PC from which data is to be read. The last reference numeral 37c is a word memory inside a CPU in which data read from other PC is to be stored.

The application command "NTO" 72d is an application command for writing data in a memory in another PC. Reference numerals 87b and 88b specify internal memories in the other PC in which data is to be written, and the meaning is the same as that of "NFROM". Reference numeral 37d indicates a word memory inside a CPU in which data to be written is stored.

Reference may be had to Japanese Laid-Open Patent Application No. 217507/1989 disclosing such a programmable controller, and Japanese Laid-Open Patent Publication No. 12303/1990 disclosing peripheral devices to the programmable controller.

In the conventional technology as described above, however, bit memories inside a functional unit are numbered in the progressive order from the one closest to the CPU unit and displayed systematically. As a result, it has been difficult to determine to which functional unit a bit memory belongs only by visually checking the bit memory display. Also, memories dedicated to a network are similarly displayed systematically, so that there has been similar inconvenience. For this reason it is difficult to prepare a program, and input misses in preparing a program easily occur, which is disadvantageous.

Also, in displays for word memories in a functional unit, it is necessary to use commands dedicated to the processing of the data contents thereof, and for this reason the number of commands to be used increases, so that an operator must remember a large number of commands, which in turn results in poor productivity as well as poor readability of a program.

Furthermore, in case of displays for internal memories (excluding those dedicated to a network) in other PCs connected through a network, it is necessary to use commands dedicated to the treatment thereof, and similar to the case of a display for word memories in a functional unit, productivity and readability of a program are disadvantageously low.

SUMMARY OF THE INVENTION

It is an object of the present invention to provide a programming device for a PC, a functional unit for a PC, and a method of inputting memory display for a programming device in which correspondence between actual functional units and displays for internal memories of a functional unit in a program is easy to understand, also correspondence between actual PCs connected to a network and memory displays dedicated to the network in a program is easy to understand, internal memories in a functional unit and those in other PCs connected to a network can be treated with the same commands, internal memory displays for a functional unit can easily be inputted, contents of a program can easily be understood, and productivity as well as readability of a program can be improved.

In a programming device for a PC according to the present invention, a program preparing means displays information concerning internal memories in a functional unit mounted in an object PC as guidance on a screen based on information on the unit as well as on unit configuration. As a result, contents of a program prepared by the programming device can easily be understood, and also productivity and readability of programs prepared by the programming device are improved.

In a programming device for a PC according to the present invention, a program preparing means displays information concerning internal memories in a functional unit mounted on an object PC based on information concerning unit as well as unit configuration as guidance on a screen. As a result, contents of programs prepared by the programming device can easily be understood, and also productivity and readability of programs prepared by the programming device are improved.

In a programming device for a PC according to the present invention, a program preparing device displays information concerning other PCs connected to each other through a network as guidance on a screen based on network information. As a result, correspondence between actual PCs connected to each other through a network and displays of memories dedicated to the network can easily be understood.

In a programming device for a PC according to the present invention, a program checking means checks whether an object PC has displays for internal memories in a functional unit included in a program inputted based on unit information as well as unit configuration information or not. As a result, contents of the programs prepared by the programming device can easily be understood, and productivity and readability of programs prepared by the programming device are improved.

In a programming device for a PC according to the present invention, a program checking means checks whether an object PC has displays for internal memories in a functional unit included in a program inputted based on unit information, unit configuration information, and base information or not. As a result, contents of programs prepared by the programming device can easily be understood, and also productivity and readability of programs prepared by the programming device are improved.

In a programming device for a PC according to the present invention, a program checking means checks whether other PCs have displays for internal memories of other PCs connected to each other through a network included in a program inputted based on network information or not. As a result, correspondence between actual PCs connected to each other through a network and displays for memories dedicated to the network in a program is easily understood, internal memories in a functional unit and those in other PCs connected to each other through a network can be treated with the same commands for internal memories in a CPU.

In a programming device for a PC according to the present invention, a memory display format converting means converts a functional unit memory display format for specifying a memory in a particular functional unit comprising a unit number display section identifying a functional unit and a memory number display section identifying a memory in a functional unit to a functional unit memory display format not including a section identifying a functional unit or vice versa. As a result contents of programs prepared by the programming device can easily be understood, and also productivity and readability of programs prepared by the programming unit are improved.

In a programming device for a PC according to the present invention, a memory display format converting means converts a functional unit memory display format for specifying a memory in a particular functional unit comprising a base number display section identifying a base section and a unit number display section identifying a functional unit and a memory number display section identifying a memory in a functional unit to a functional unit memory display format not including a section identifying a base section and a functional unit or vice versa. As a result, contents of programs prepared by the programming device can easily be understood, and also productivity and readability of programs prepared by the programming device are improved.

In a programming device for a PC according to the present invention, a memory display format converting means converts a network memory display format comprising a network number display section identifying other PCs connected to a communications network and a memory display section for other PCs described above to a functional unit memory display format not including a network number display section or vice versa. As a result, contents of programs prepared by the programming device can easily be understood, and also productivity and readability of programs prepared by the programming device are improved.

In a programming device for a PC according to the present invention, a comment processing means prepares, selects and displays on a screen a unit sign identifying a functional unit, a unit number, a memory sign identifying a memory in a functional unit and a comment corresponding to a memory number. As a result, displays for internal memories in a functional unit can easily be inputted, contents of programs prepared by the programming device can easily be understood, and productivity and readability of programs prepared by the programming device are improved.

In a programming device for a PC according to the present invention, a comment storage means stores in a functional unit a unit sign identifying a functional unit and a unit number, and a memory sign identifying a memory in a functional unit and a comment corresponding to a memory number. As a result, displays for internal memories in a functional unit can easily be inputted, contents of programs prepared by the programming device can easily be understood, and productivity and readability of programs prepared by the programming device are improved.

Other objects and features of this invention will become understood from the following description with reference to the accompanying drawings.

BRIEF DESCRIPTION OF THE DRAWINGS

FIG. 1 is a block diagram illustrating THE configuration of a programming device;

FIG. 3 is an explanatory view illustrating a format of displays for memories in a functional unit;

FIG. 4 is an explanatory view illustrating an example of a program based on a memory display format;

FIG. 5 is an explanatory view illustrating a unit specification information table with specifications of a functional unit which can be mounted in an object PC stored therein;

FIG. 6 is an explanatory view illustrating a unit configuration information table with information on the configuration of a functional unit available in an object PC stored therein

FIG. 11 is an explanatory view illustrating a format of displays for memories in a functional unit when an extended base section is mounted therein;

FIG. 12 is an explanatory view illustrating an example of a program having the memory display format shown in FIG. 11;

FIG. 13 is an explanatory view illustrating a base specification information table showing configuration of a base section as well as an extended base section in an object PC;

FIG. 18 is an explanatory view illustrating a memory display format for memories inside a CPU of another PC connected through a network or internal memories in a functional unit;

FIG. 19 is an explanatory view illustrating an example of a program having the memory display format shown in FIG. 18;

FIG. 20 is an explanatory view illustrating a network information table in which numbers and types of PCs connected to a PC to be programmed through a network are set;

FIG. 25 is an explanatory view illustrating a functional unit header memory number table in which a header bit memory number in a functional unit is stored;

FIG. 26 is a flow chart illustrating processing operations for converting a functional unit memory display format specifying a memory in a particular functional unit in a conventional format;

FIG. 28 is an explanatory view illustrating a functional unit header memory number table in which a header memory number of a functional unit mounted in each slot based on the conventional format is stored;

FIG. 29 is an explanatory view illustrating a base header unit number table in which a header unit number of a unit mounted in a base and an extended base is stored;

DESCRIPTION OF THE PREFERRED EMBODIMENTS

Figure 2:
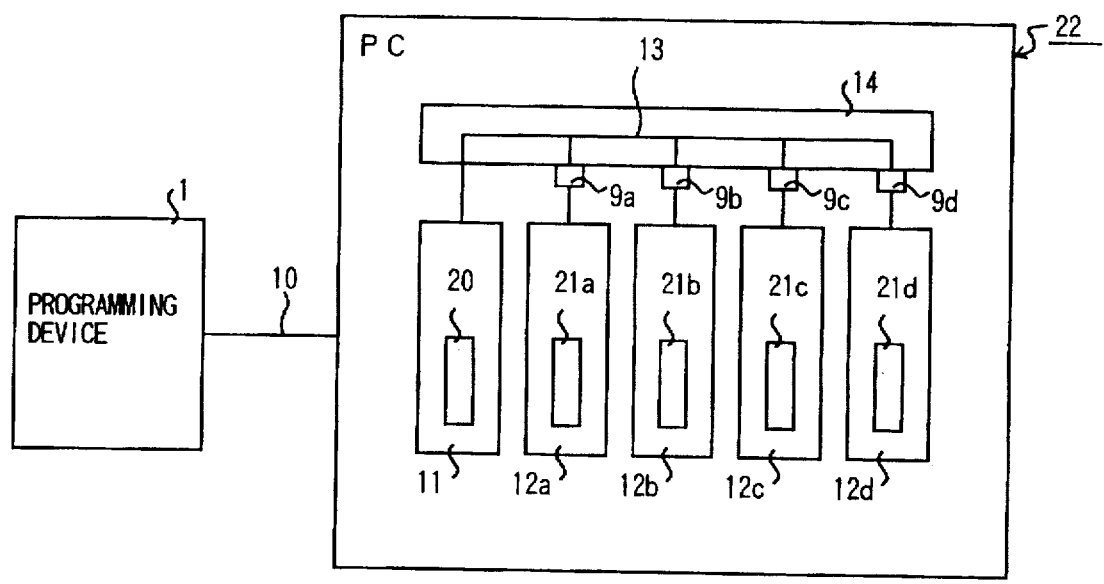
FIG. 2 is a block diagram illustrating the system configuration of a PC.

A detailed description is given hereinafter of a programming device for a PC, a functional unit for a PC, and a method of inputting memory displays into an input device according to the present invention.

At first, a description is given of an Embodiment 1 of the present invention.

FIG. 1 shows the configuration of a programming device according to Embodiment 1. In this figure, designated by reference numeral 1 is a programming device for preparing a program for a PC, at 5 a display unit for a programming device such as a monitor, at 6 an input device for a programming device such as a keyboard, at 3 a unit specification information table with specifications of a functional unit which can be mounted in an object PC stored therein, at 4 a unit configuration information table with information on the configuration of a functional unit used in an object PC stored therein, and at 2 a program preparing means for assisting input of a program based on the unit specification information table 3 and the unit configuration information table 4.

FIG. 2 shows the system configuration of a PC which executes a program prepared by the programming device 1. FIG. 2 is the same as FIG. 38 described above in relation to the conventional technology, so that a further description thereof is omitted.

FIG. 3 shows a format of displays for memories in a functional unit provided as displays on a screen of a programming device for a PC. In this figure, designated at 30 is a format of displays for memories in a functional unit, at 31 a unit sign indicating that the associated numeral is a unit number, at 32 a unit number indicating an ID number of a unit, at 33 a separation sign, at 34 a memory sign indicating that the associated numeral is the number of a particular memory, and at 35 a memory number indicating the ID number of a memory.

FIG. 4 shows an example of a program based on a format for displays of memories shown in FIG. 3. In this figure, designated by reference numerals 30a to 30f are displays for memories of functional units each indicating that each memory is a memory inside a functional unit, at 36a, 36b application commands each used for transferring data between memories, at 37a, 37b displays for internal memories in a CPU unit each indicating that the memory is a memory inside the CPU, at 40a to 40c contact signs each indicating that the command is a contact command, at 41 a coil sign indicating that the command is a coil command, and at 42a, 42b application command signs each indicating that the command is an application command.

FIG. 5 shows a concrete example of the unit specification information table shown in FIG. 1. In this figure, designated by reference numeral 50 is a unit name indicating a name of a functional unit, at 51 a number of bits of an input bit memory indicating a capacity of an input bit memory incorporated in a functional unit, at 52 a number of bits of an output bit memory indicating the capacity of an output bit memory incorporated in a functional unit, and at 53 is a number of words indicating the capacity of a word memory incorporated in a functional unit.

FIG. 6 shows a concrete example of the unit specification information table 4 shown in FIG. 1. In this figure designated by reference numeral 60 is a slot number indicating a position for mounting a unit device on a base, and at 50 a name of a unit mounted in a slot.

Figure 7:
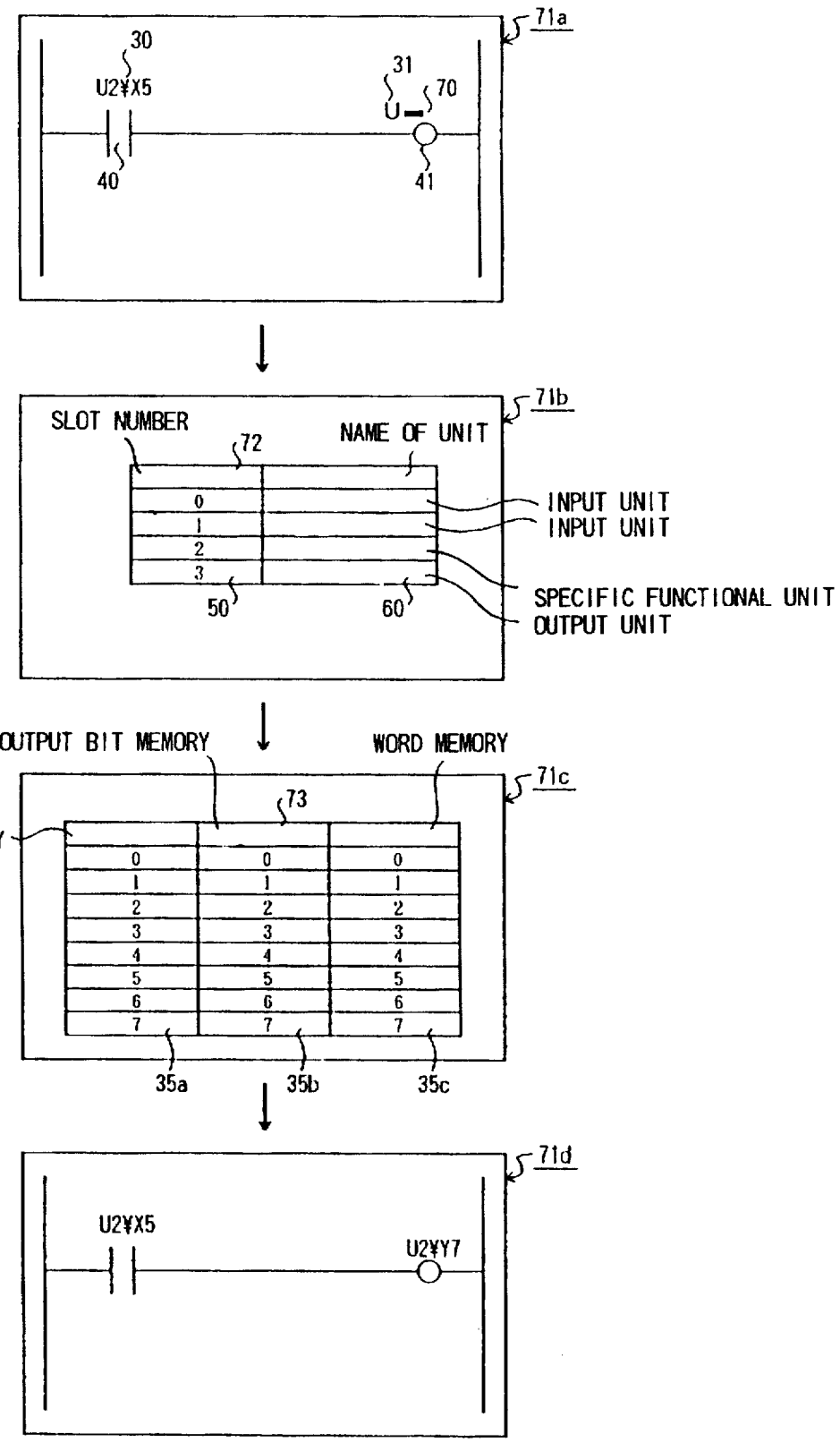
FIG. 7 is an explanatory view illustrating a screen display of a programming device when a program is prepared.

FIG. 7 shows a screen display in a programming device when a program is prepared based on the memory display format shown in FIG. 3. In this figure, at reference numerals 71a to 71d are screen displays in a programming device, at 70 a cursor indicating an input position for a current program, at 72 a unit select menu for selecting a unit incorporating a memory in which a program is to be inputted, at 50 a slot number indicating a position for mounting a unit on a base, at 60 a unit name indicating a name of a functional unit, at 73 a memory select menu for specifying a memory in which a program is to be inputted, at 35a a memory number of an input bit memory, at 35b a memory number of an output bit memory, and at 35c a memory number of a word memory. Other portions are the same as those described in relation to FIG. 3 and FIG. 4, so that a further description thereof is omitted.

Figure 8:
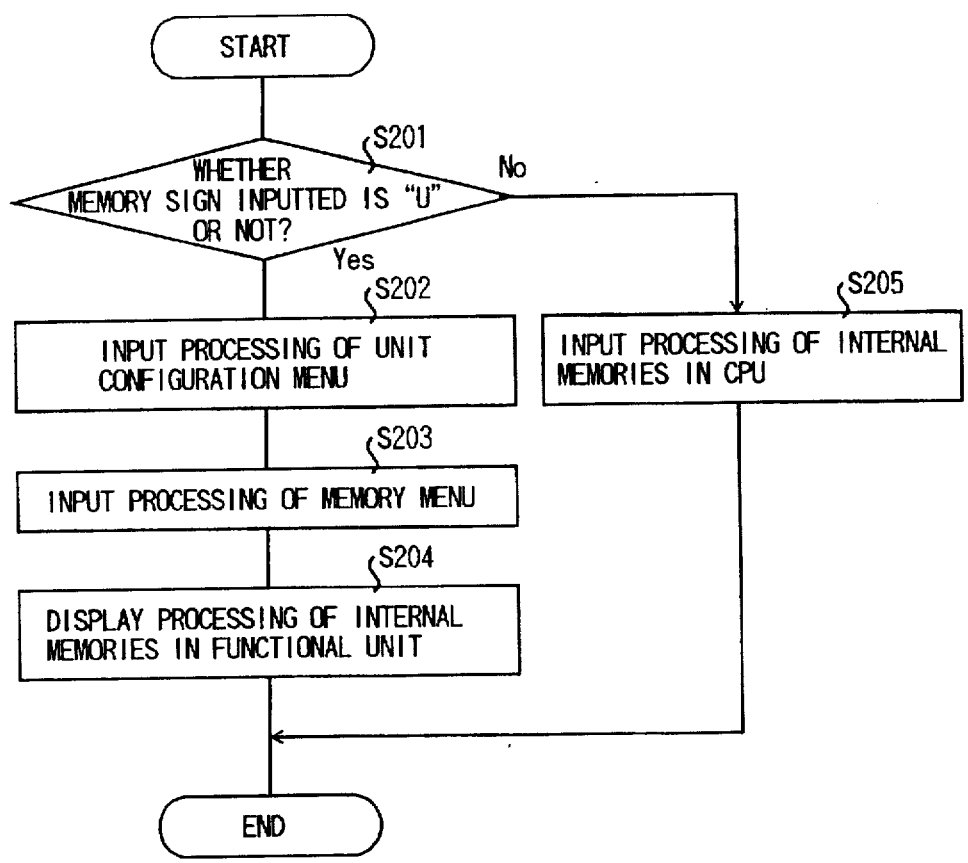
FIG. 8 is a flow chart illustrating processing operations by a programming preparing means in a programming device when a program is prepared.

FIG. 8 is a flow chart illustrating processing operations carried out by the programming preparing means 2 in the programming device 1 when a program is prepared based on the memory display format shown in FIG. 3. At first a description is given for a format of displays for memories in a functional unit provided by the programming device 1 according to the embodiment shown in FIG. 3. The unit number 32 shown in FIG. 3 is decided by the slot 9 of a PC in which a functional unit 12 has been mounted, and the units are numbered in the order of No. 0, No. 1, ... starting from the unit closest to the CPU unit. For this reason, in FIG. 2, a slot number of a functional unit 12a is 0, while a slot number of a functional unit 12b is 1. The memory sign 34 is displayed as "X" for an input bit memory, as "Y" for an output bit memory, and as "G" for a word memory. The memory number 35 indicates a position assuming that a header of internal memories in each functional unit body is No. 0.

Based on this memory display format 30 for a functional unit, for instance, a memory at a fifth bit from a header of an input bit memory among internal memories 21 in the functional unit 12c shown in FIG. 2 is displayed as U2\X4.

Next, a description is given for a program prepared by the programming device shown in FIG. 4 with reference to the system configuration of a PC shown in FIG. 2.

The left side section of the first line indicates that U2\X4, namely the fifth bit from the header of input bit memories in the functional unit 12c shown in FIG. 2, is used as a contact 40a. The right side of the first line indicates that U3\Y7, namely, the eighth bit from the header of output bit is memories in the functional unit 12d shown in FIG. 2 is used as a coil 41.

The left side section of the second line is the same as that of the first line, and hence a further description thereof is omitted. The right side section is an application command MOV 36a for transferring data. This command indicates that the contents of a memory indicated by a first argument is copied in a memory indicated by a second argument. In this example, the first argument U2\G5, namely the contents of the sixth word from the header of word memories in the functional unit 12c shown in FIG. 2, is copied in D037a, which is an internal memory in the CPU unit. Furthermore, the third line is the same as the second line, and hence a further description thereof is omitted.

Next, a description is given of operations for inputting into a memory display section of a programming device with reference to the flow chart shown in FIG. 8. When a user presses down the key U of the input device shown in FIG. 1, in Step S201, a determination as to whether a sign inputted first as an input for memory display is "U" or not is executed. If it is determined that the sign is "U" (Refer to the screen 71a shown in FIG. 7), the processing shifts to Step S202 for input processing for internal memory display in a functional unit, while, to the contrary, if it is determined that the sign is not "U", the processing shifts to Step S205 for input of display of internal memory in a CPU unit.

In Step S202, a unit select menu displaying unit configuration based on system configuration of an object PC is provided on a screen of the display unit 5 shown in FIG. 1 (Screen 71b shown in FIG. 7) based on the unit configuration information table 4 shown in FIG. 6 to cause a user to select any unit by pressing a necessary key of the input device shown in FIG. 1. When selection by the user is finished. the processing shifts to Step S203. It should be noted that FIG. 7 shows a case where a specific functional unit having a slot number of 3 has been selected.

In Step 203, specifications of the selected unit are read from the unit specification information table. and a memory select menu is displayed on a screen of the display unit 5 shown in FIG. 1 based on the information read as described above (Screen 71c shown in FIG. 7). Then. the user is prompted to select a particular number of a particular memory by pressing necessary keys of the input device shown in FIG. 1. When selection by the user is finished, the processing shifts to Step S204. It should be noted that FIG. 7 shows a case where the output bit memory No. 7 has been selected.

In Step S204, the slot number selected in Step S202 above is regarded as a unit number, and displays for internal memories in a functional unit are assembled from the unit number, a memory type, and a memory number selected in Step S203. Then, the result is displayed on the screen of the display unit 5 shown in FIG. 1 (screen 71d shown in FIG. 7).

In Step S205, displays of internal memories in the CPU unit, namely, an input processing operation in the conventional technology, is executed.

It should be noted that the unit configuration information table 4 may be inputted by a user based on the system configuration of the PC 22 into the programming device 1, or if the PC 22 is connected to the programming device 1 for a PC, the table 4 can automatically be prepared by reading it from the PC 22.

Also, it should be noted that, although a description is given with reference to FIG. 2 showing a case where the programming device 1 for a PC is connected to the PC 22 because the case can be understood easily, the PC 22 is not indispensable for embodying the present invention and that, even if the PC 22 has not been connected, the same effects can be achieved if a user inputs the system configuration of the PC 22 into the unit configuration information table 4.

Next, a description is given of an Embodiment 2 of the present invention.

Figure 9:
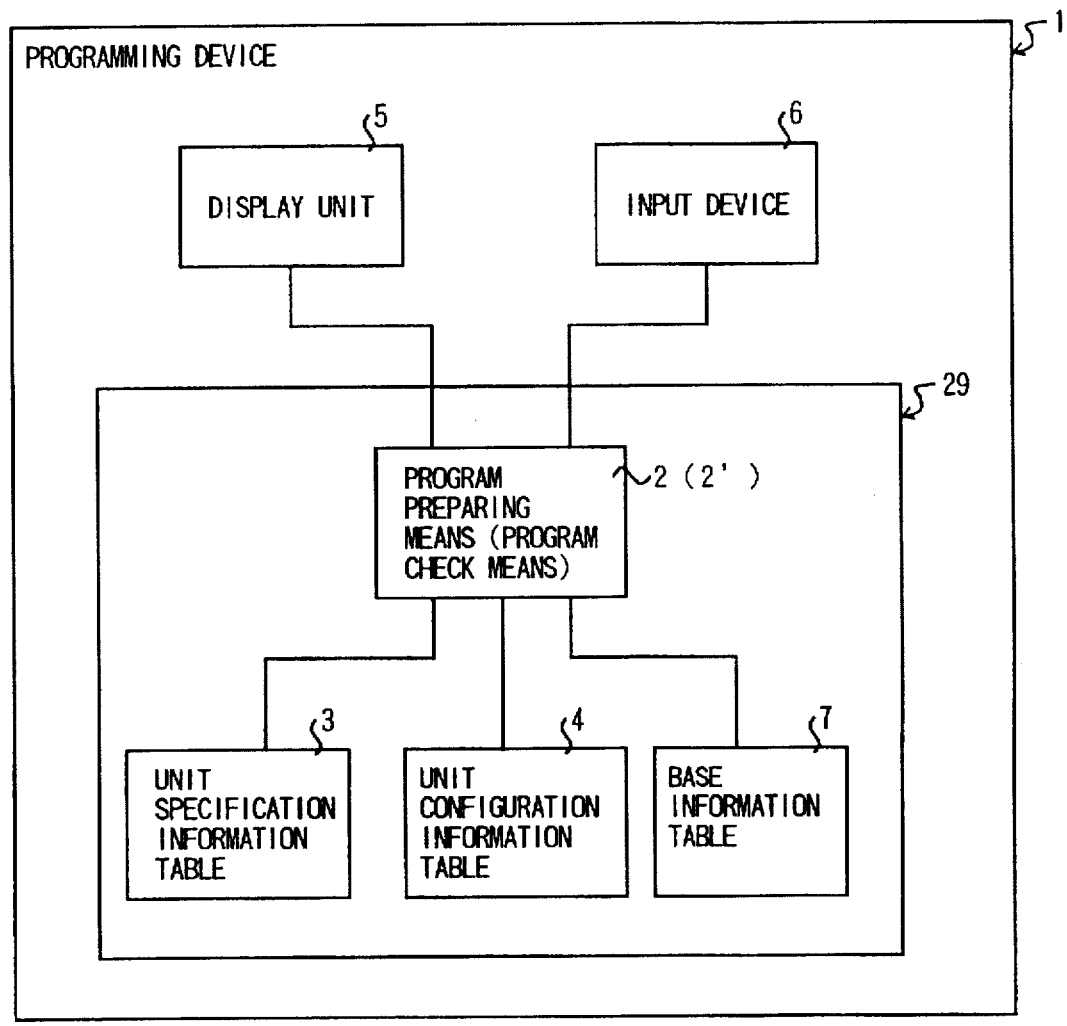
FIG. 9 is a block diagram illustrating another configuration of a programming device.

FIG. 9 shows the configuration of a programming device according to Embodiment 2. In this figure designated by reference numeral 7 is a base information table in which the configuration of a base section for mounting and connecting a CPU unit and a functional unit and an extension base section for extending the base section has been stored. Other portions are the same as in FIG. 1 described in relation to Embodiment 1 above, and hence a further description thereof is omitted.

Figure 10:
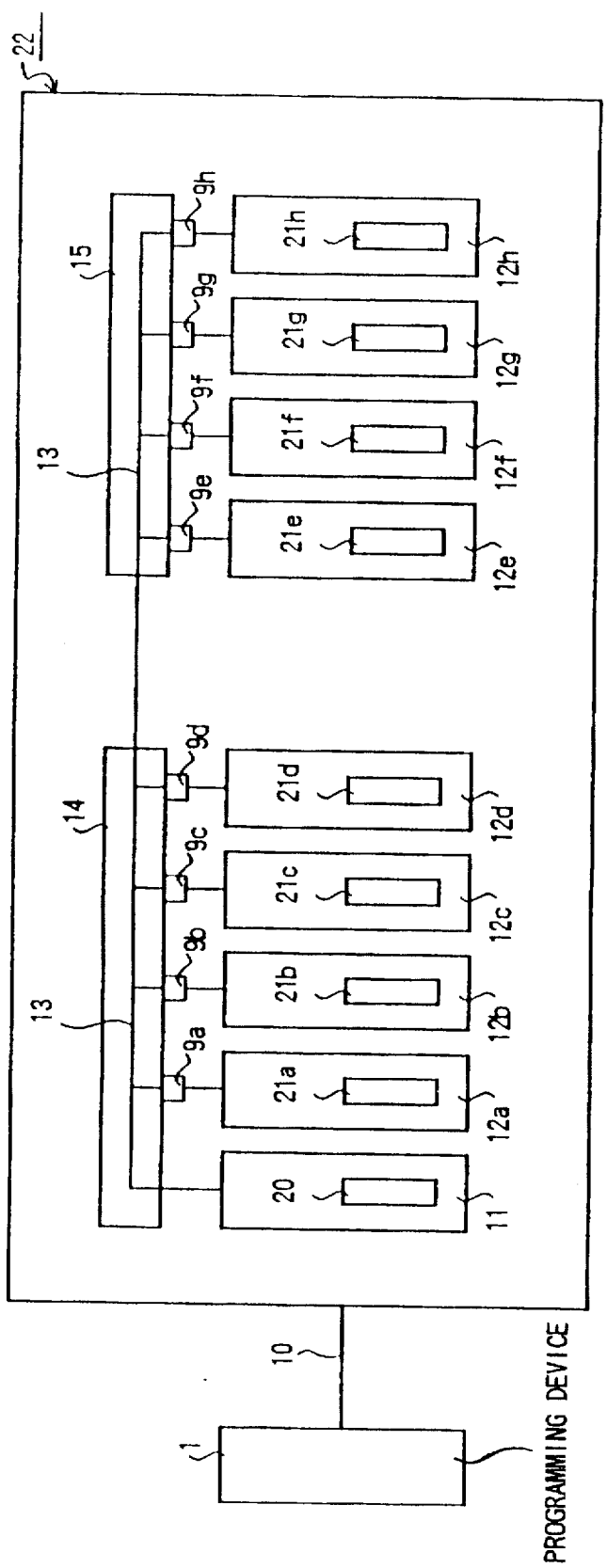
FIG. 10 is a block diagram illustrating another system configuration of a PC.

FIG. 10 shows the system configuration in a case where an extension base is used. This figure shows the system configuration of a PC in the case where an extension base section 15 is added to the configuration shown in FIG. 2. Four functional units 12e to 12h are mounted thereto. FIG. 2 was already described in relation to the case of the conventional approach, and the content thereof is the same as shown in FIG. 2, except that the extension base section 15 has been added. As such, a further detailed description is omitted.

FIG. 11 shows the format of memory displays in a functional unit provided as screen displays in a programming unit for a PC in the case where the extension base section 15 has been mounted. In this figure, designated by reference numeral 80 is a display for memories in a functional unit with a base display function, at 81 a base sign indicating that the associated numeral is a base number, at 82 is a base number indicating the ID number of the base. Other portions are the same as in FIG. 3 described in relation to Embodiment 1 above.

FIG. 12 shows an example of a program having the memory display format shown in FIG. 11. In this figure, designated by reference numeral 80 is a memory display for a functional unit with a base display function. Other portions are the same as in FIG. 4 described in relation to Embodiment 1 above.

FIG. 13 shows an example of the base information table shown in FIG. 9. In this figure, designated by reference is numeral 82 is a base number, and at 91 a number of slots.

Figure 14:
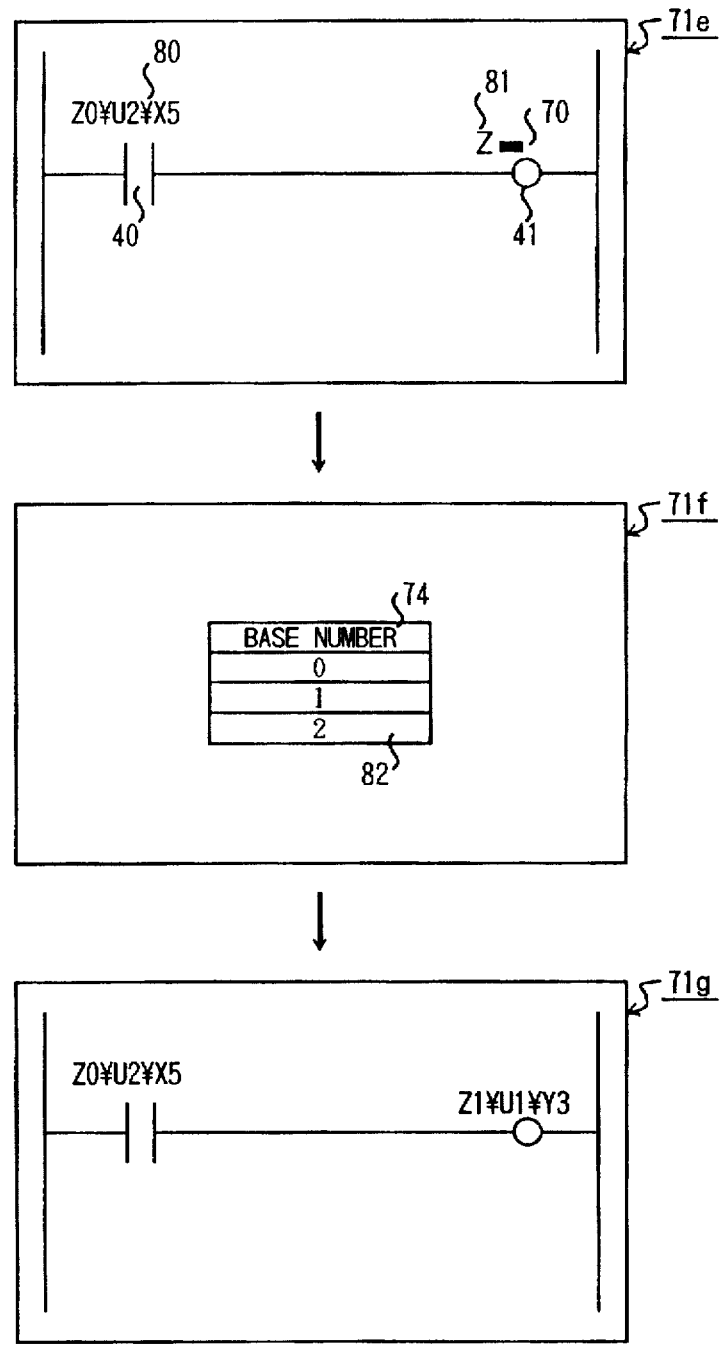
FIG. 14 is an explanatory view illustrating screen display for a programming device when a program is prepared.

FIG. 14 shows a screen display for a programming device when a program based on the memory display format shown in FIG. 11 is prepared. In this figure, at reference numeral 80 is a memory display for a functional unit with a base display function, at 81 a base sign, at 82 a base number, at 74 a base configuration menu, while other portions are the same as shown in FIG. 7 described in relation to Embodiment 1 above.

Figure 15:
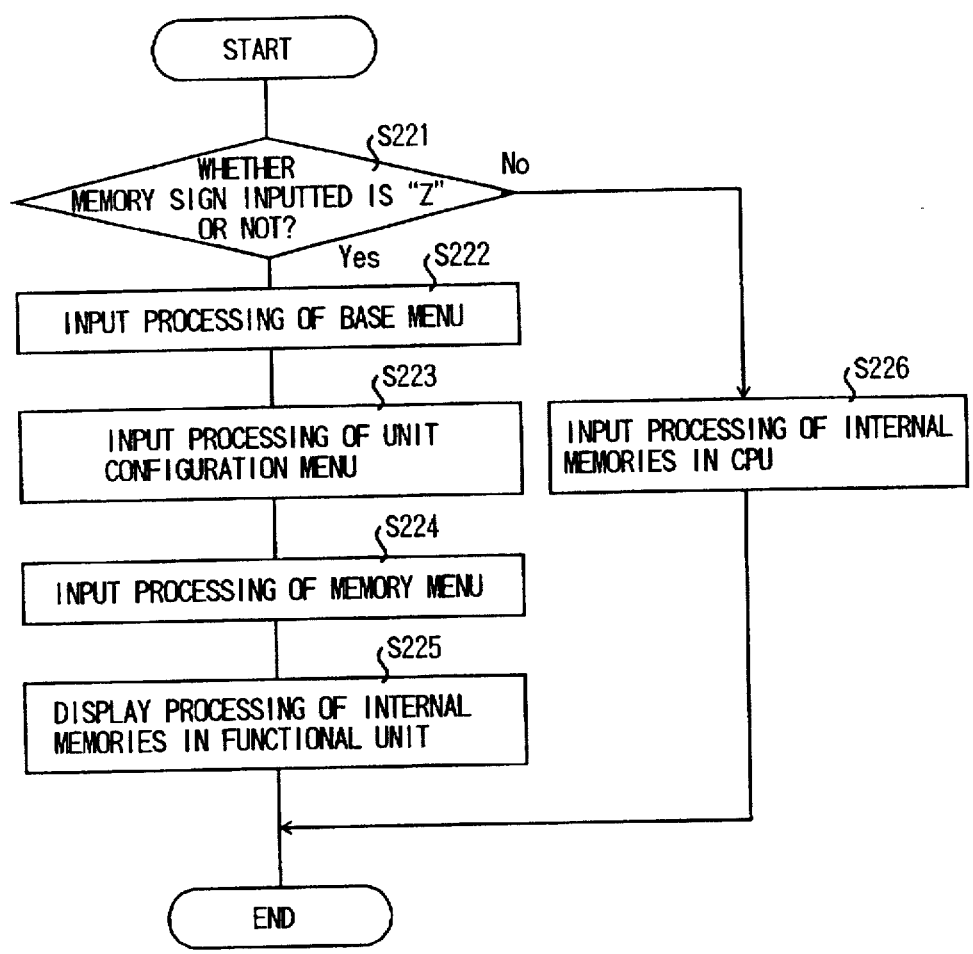
FIG. 15 is a flow chart illustrating processing operations by a program preparing means in a programming device when a program is prepared.

FIG. 15 is a flow chart illustrating processing operations carried out by the program preparing means 2 in a programming device when a program based on the memory display format shown in FIG. 11 is prepared.

Next, a description is given of the formatting of displays for memories in a functional unit by the programming device shown in FIG. 11. As for the base number 82, the number of a base section mounted in a CPU unit is No. 0, and extended base sections are numbered from the one closest to the CPU unit as No. 1, No. 2, etc. Other portions are basically the same as shown FIG. 3 described in relation to Embodiment 1 above.

Herein, the unit number is assigned from "0" every base section. For instance, in FIG. 10, the internal bit memory No. 0 in the functional unit 12e is displayed as Z1\U0\X0.

Next, a description is given for a program prepared by the programming device shown in FIG. 12 with reference to the system configuration of the PC shown in FIG. 10. The left side section of FIG. 12 indicates that Z0\U1\X5, namely the sixth is bit from the header of the input bit memory in the functional unit 12d mounted in the base section 14 with a CPU shown in FIG. 10 incorporated therein is used as a contact 40. On the other hand, the right section indicates that contents of Z1\U2\G5. Specifically, the sixth word from the header of a word memory in a functional unit 12f mounted in the extended base section 15 is copied in DO (37), which is an internal memory inside the CPU, according to the application command MOV36.

Next, with reference to the flow chart shown in FIG. 15, a description is given of operations for inputting a memory display section into a programming device by a programming device for memory display input. At first, when a user presses the key Z of the input device shown in FIG. 9, in Step S221, determination as to whether the sign first inputted as an input for memory display is "Z" or not is executed. If it is determined that the sign is "Z" (refer to the screen 71e shown in FIG. 14), the processing shifts to Step S222 for processing to input a display for memories in a functional unit. On the contrary, if it is determined that the sign is not "Z", the processing shifts to Step S226 to input a display for internal memories in a CPU unit.

In Step S222, a base select menu displaying base configuration based on the system configuration of an object PC is displayed in the display unit 5 shown in FIG. 9 based on a base information table shown in FIG. 13 (refer to the screen 71f shown in FIG. 14), and the user is prompted to select a base by pressing the corresponding keys of the input device shown in FIG. 9. When a base is selected, the processing shifts to Step S224. FIG. 7 shows a case where an extended base section having a base number of 1 has been selected.

In Step S223, a unit select menu displaying unit configuration information based on the system configuration of the object PC is displayed on the screen of the display unit 5 shown in FIG. 9 (refer to the screen 71b shown in FIG. 7) based on the unit configuration information table (refer to FIG. 6) in the selected base, and a user is prompted to select a unit by pressing a necessary key of the input device 6 shown in FIG. 9. When a unit is selected, the processing shifts to Step S224. FIG. 7 shows the case where a specific functional unit having a slot number of 3 has been selected.

In Step S224, specifications of the selected unit are read from the unit specification information table 3, and a memory select menu is displayed on the screen of the display unit 5 shown in FIG. 9 (refer to the screen 71c shown in FIG. 7) based on the specifications. Then, a user is prompted to select a particular number of a particular memory by pressing a necessary key of the input device 6 shown in FIG. 6. When a particular number is selected, the processing shifts to Step S225. FIG. 7 shows the case where an output bit memory having a memory number of 7 is selected.

In Step S225, the slot number selected in Step S223 is regarded as a unit number, and based on the selected slot number, memory type and a memory number selected in Step S224, an internal memory display for a functional unit is assembled. Then, the result is displayed on the screen of the display unit 5 shown in FIG. 9 (refer to the screen 71g shown in FIG. 7). Also in Step S226, display for internal memories in a CPU unit, namely, input processing for the conventional type of display, is executed.

It should be noted that the unit configuration information table 4 as well as for the base information table 7 may be inputted into the programming device 1 for a PC by a user based on the system configuration of the PC 22, or may automatically be generated by reading the tables from the PC 22 if the PC 22 is connected to the programming device 1 for a PC.

Also in this embodiment, because of the characteristics of the invention, it is easier to understand the invention for a case where the programming device 1 for a PC is connected to the PC 22, and accordingly a description is given herein with reference to FIG. 2 showing a case where the programming device 1 for a PC is connected to the PC 22. However, the PC 22 is not indispensable for embodying the present invention. That is, also in a case where no PC 22 has been connected, if the system configuration of the PC 22 is inputted by a user into the unit configuration information table 4 and the base information table 7, the same effects can be achieved.

Next, a description is given for Embodiment 3 of the present invention.

Figure 16:
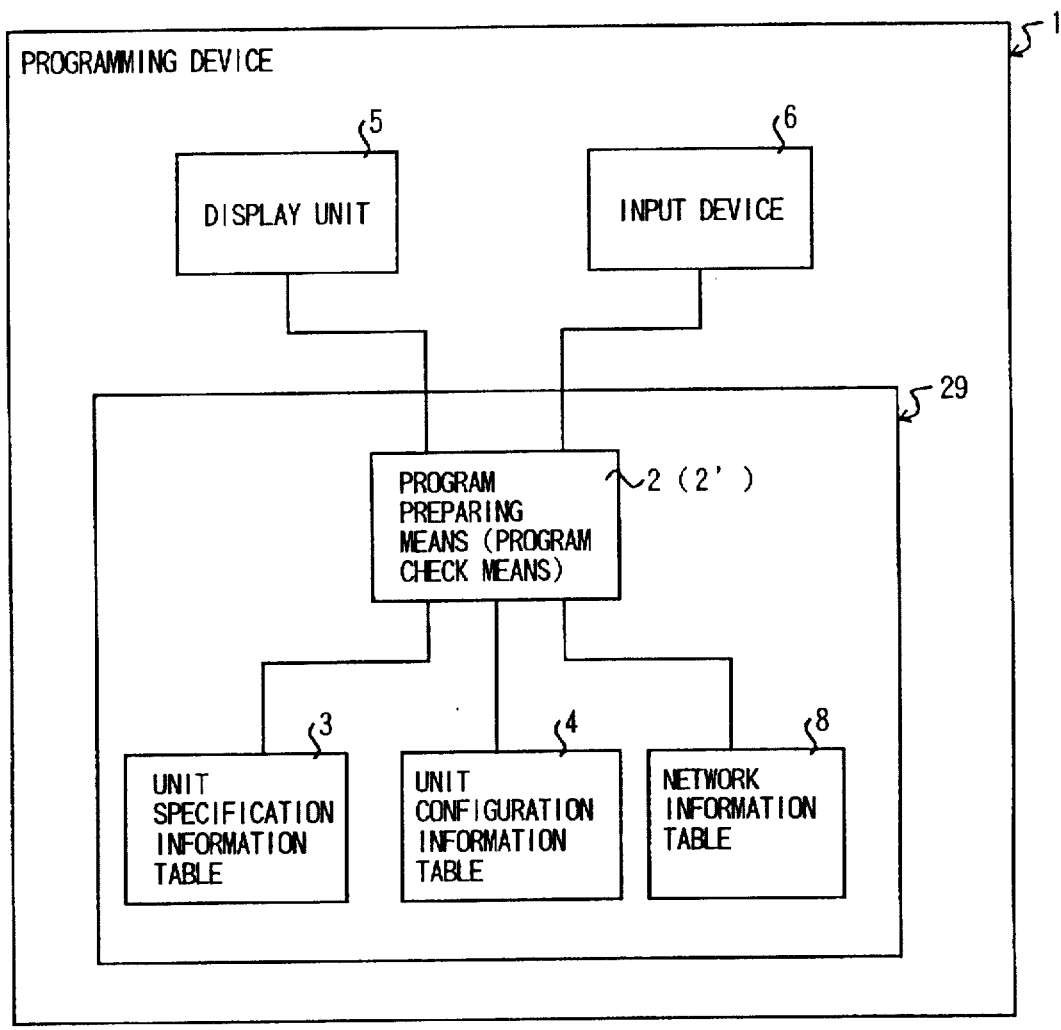
FIG. 16 is a block diagram illustrating other configuration of a programming device.

FIG. 16 shows the configuration of the programming device according to Embodiment 3. In this figure, designated by reference numeral 8 is a network information table in which the types of other PCs connected to the communications network are stored. Other portions are the same as in FIG. 1 described in relation to Embodiment 1 above, and thus a further description is not provided.

Figure 17:
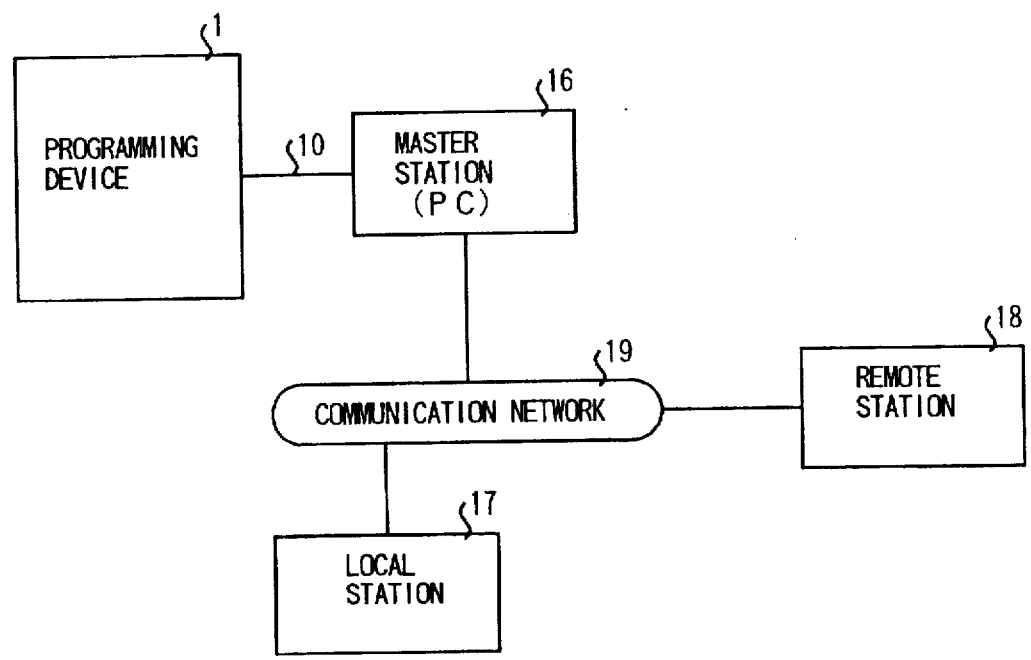
FIG. 17 is a block diagram illustrating system configuration of a PC which executes a program prepared by a programming device.
Figure 41:
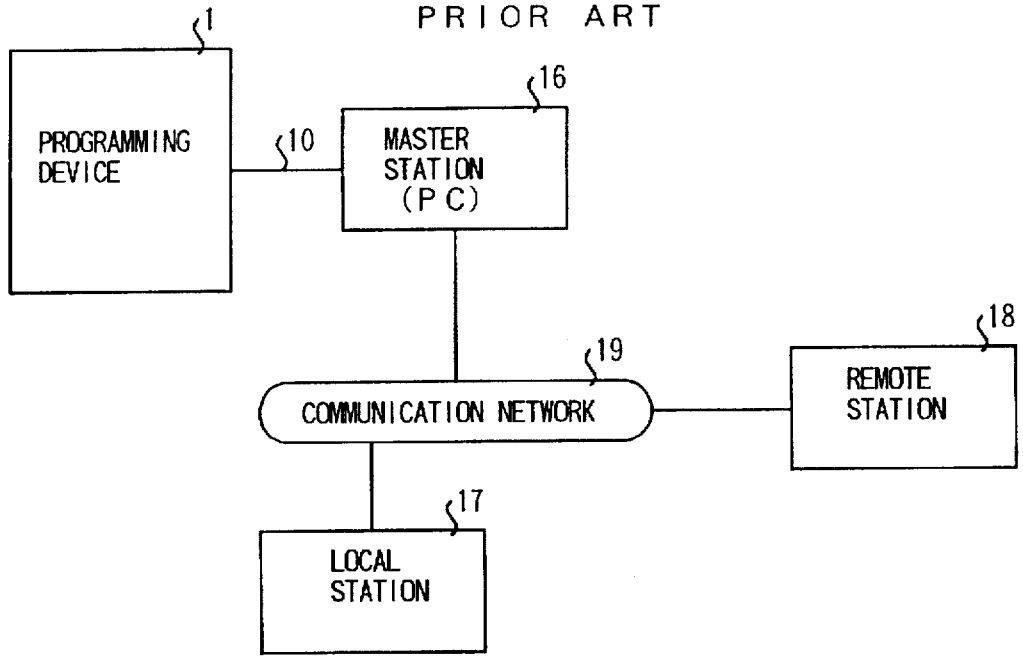
FIG. 41 is a block diagram illustrating the system configuration of a PC which executes a program prepared on a programming device.
Figure 42:
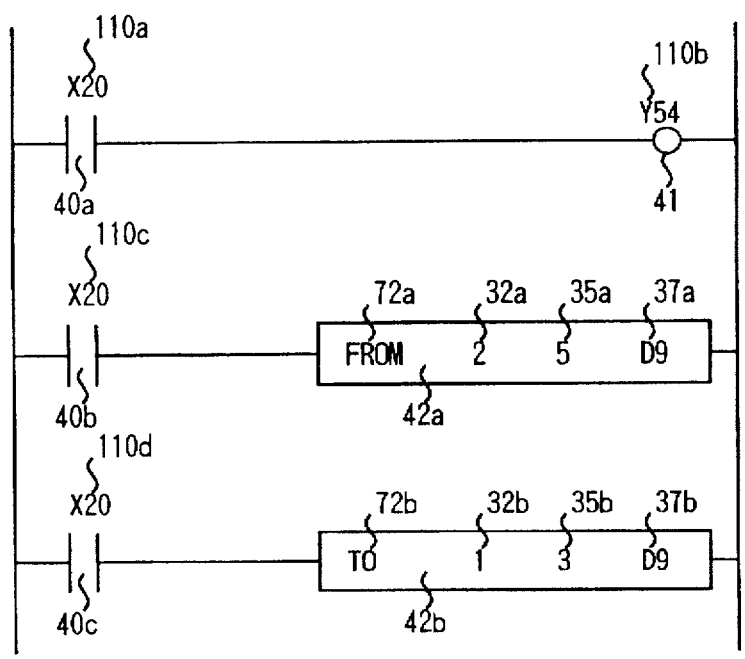
FIG. 42 is an explanatory view illustrating an example of a conventional program.
Figure 43:
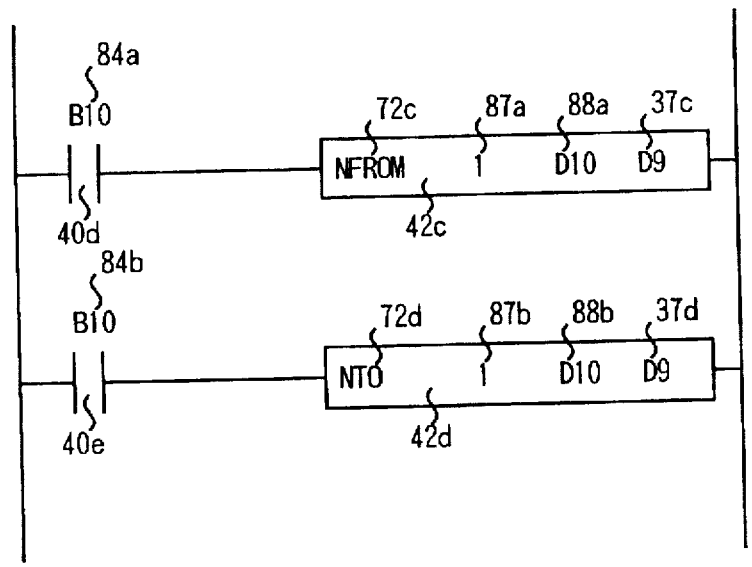
FIG. 43 is an explanatory view illustrating an example of a program in the master station shown in FIG. 37.

FIG. 17 shows the system configuration of a PC which executes a program prepared by the programming device 1. FIG. 17 is the same as FIG. 41 already described in relation to the conventional approach, and hence a further description is not provided.

FIG. 18 shows the format of displays provided as screen displays in the programming device 1 for a PC for memories inside a CPU in another PC connected through a network or for internal memories in a functional unit. In this figure, designated by reference numeral 85 is a memory display for another PC connected through a network, at 86 a network sign indicating that the subsequent number is a network number, at 87 a network number, at 83 a separation sign, at 88 displays for memories in a PC such as those inside a CPU or internal memories in a functional unit.

FIG. 19 shows an example of a program based on the memory display format shown in FIG. 18. In this figure, designated by reference numeral 85 is a memory display for another PC connected through a network. Other portions are the same as in FIG. 4 described in relation to Embodiment 1 above.

FIG. 20 shows an example of a network information table 8. In this figure reference numeral 87 indicates a network number which is an ID number of a PC on the network, while reference numeral 95 indicates a type of PC.

Next description is given for a display format for memories in a functional unit set by a programming device shown in FIG. 18.

As for the network number 87, 0 is assigned to a master station controlling a network, while the other local stations and remote stations can be freely numbered (so long as there is no duplication of numbers). Also, displays are provided for memories inside a CPU or for memories in a functional unit.

Next, operations of a programming device used to input displays for memories is described below.

As for other PCs connected via a network, if it is assumed that no extended base is used, the operation described in relation to Embodiment 2 above remains applicable if the processor reads a section for inputting a base number based on a base information table as a section for inputting a network number based on the network information table 7. For this reason, for this embodiment, the flow chart and illustrations concerning screen display flow are omitted.

It should be noted that, although no specific disclosure concerning the preparing means for preparing the unit configuration information table 4 and the network information table 8 is provided herein, the tables may be input by a user into the programming device 1 for a PC based on the system configuration of the PC 22, or may automatically be generated by reading from the PC 22 if the PC 22 is connected to the programming device 1.

Although this embodiment describes for purposes of clarity the case where the programming device 1 is connected to the PC 22, the PC 22 is not indispensable. If a user previously inputs the system configuration for the PC 22 into the unit configuration information table 4 and the network information table 8, the same effects can be achieved.

A fourth embodiment will now be described. As for the configuration of the programming device according to this embodiment, the arrangement is the same as in FIG. 1, except that the program preparing means 2 is reconfigured as a program check means 2' for checking input of a program based on the unit specification information table 3 and the unit configuration information table 4. In this figure, portions other than the program checking means 2' are the same as those in Embodiment 1, and a detailed description is therefore omitted.

As in Embodiment 1, in Embodiment 4, FIG. 2 shows the system configuration of a PC which executes a program prepared by the programming device 1, FIG. 3 shows the format of displays for memories in a functional unit, FIG. 4 shows an example of a program based on the memory display format shown in FIG. 3, FIG. 5 shows a unit specification information table, and FIG. 6 shows a unit configuration information table, each of the above components having already been described above.

Figure 21:
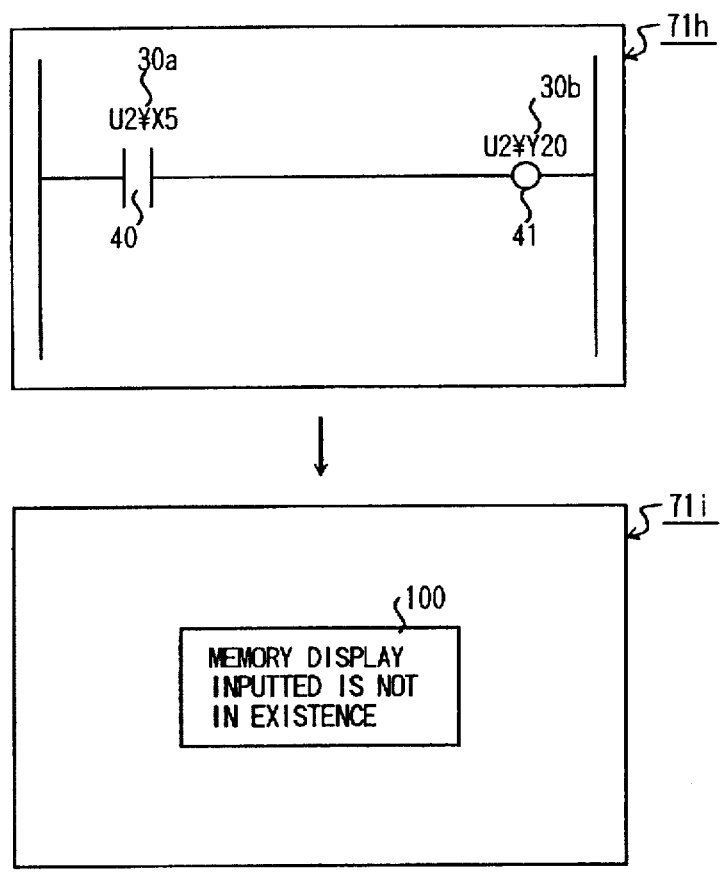
FIG. 21 is an explanatory view illustrating screen display for a programming device when a program is prepared.

FIG. 21 shows a screen display when a program is prepared based on the memory display format shown in FIG. 3. In this figure reference numeral 100 indicates display of an error message, and other portions are the same as the contents of FIG. 7 described in relation to Embodiment 1 above.

Figure 22:
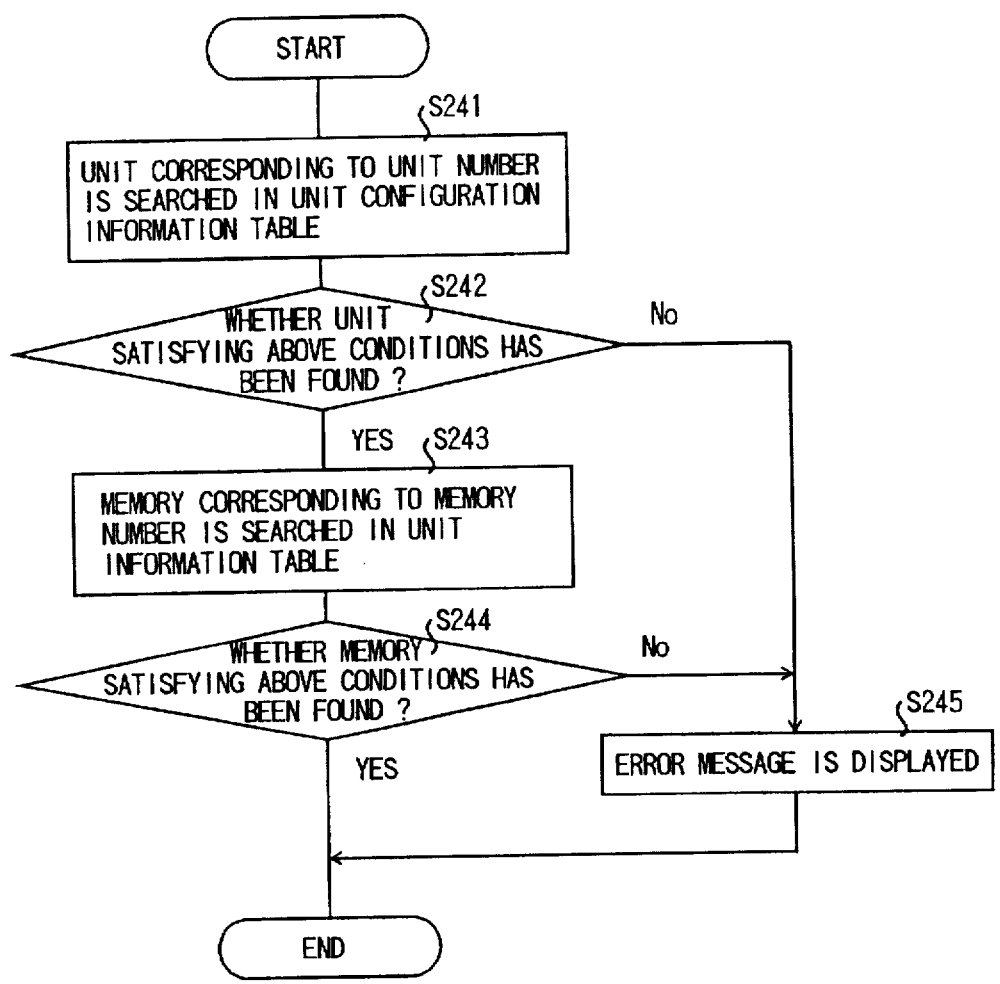
FIG. 22 is a flow chart illustrating processing operations by a program checking device when a program is prepared by a programming device.

FIG. 22 shows a flow chart illustrating processing by the program checking means 2' when a program based on the memory display format shown in FIG. 3 is prepared by the programming means according to the present Embodiment. Description is given below of operations performed by the program checking means 2' following the flow chart shown in FIG. 22. This processing is executed, when displays for internal memories in a functional unit are inputted by pressing down keys of the input device 6 and set during programming by the programming device (The screen 71a shown in FIG. 21 is displayed on the display unit 5 shown in FIG. 1), to check the input. The example of the screen 71h shown in FIG. 21 shows the case where, immediately after the section 30b is inputted, the section 30b is checked.

In Step S241, to check whether a unit corresponding to the unit number of 32 exists in the system configuration of a PC among inputted displays for internal memories in a functional unit or not, a unit number which coincides with the unit number of 32 is searched in the unit configuration information table. Then the processing shifts to Step S242.

In Step S242 determination as to whether a unit satisfying the above conditions has been found by searching in Step S241 above is executed. As a result, if it is determined that a unit has been found, the processing shifts to Step S243, and if it is determined that no unit has been found, the processing shifts to Step S245.

In Step S243, to check whether a memory corresponding to the memory type indicated by the memory sign 34 and the memory number 35 exist among the input displays for the internal memories in a functional unit, a memory number 35 corresponding to the memory sign 34 is searched in the unit specification information table.

In Step S244, determination as to whether a memory satisfying the above conditions has been found through retrieval in Step S243 above is executed. If it is determined that such memory has been found, it is determined that there is no abnormality, and the processing is terminated, and if it is determined to the contrary that no memory has been found, the processing shifts to Step S245.

In Step S245, an error message indicating that the memory indicated by the inputted internal memory display does not exist is displayed on a screen of the input device 5 shown in FIG. 1 (Refer to the screen 71i in FIG. 21), and processing is completed. It should be noted that, although no specific disclosure concerning preparing means for preparing the unit configuration information table 4 is provided in this embodiment, a user may input this information into the programming device 1 based on the system configuration of the PC 22, or the table 4 may automatically be generated by reading from the PC 22 if the PC 22 is connected to the programming device 1.

Because of the characteristics of the present invention, it is easier to understand the present invention when the present invention is described with reference to a case where the programming device 1 is connected to the PC 22, so that the above description has been made with reference to the contents of FIG. 2 in which the programming device 1 is connected to the PC 22, but for embodying the present invention, the PC 22 is not indispensable, and even if the PC 22 has not been connected thereto, the same effect can be achieved on the condition that the system configuration of the PC 22 is inputted beforehand by a user into the unit configuration information table 4.

Next, a description is given of Embodiment 5. As for configuration of the programming device, the program preparing means 2 in FIG. 9 described in relation to Embodiment 2 above is configured as a program checking means 21" for checking input of a program based on the unit specification information table 3, unit configuration information table 4, and base information table 7. The content of this figure is the same as that of Embodiment 2 excluding the program checking means 2".

FIG. 10 shows the system configuration of a PC which executes a program prepared by the programming device 1, FIG. 11 shows a format of displays for memories in a functional unit, FIG. 12 shows an example of a program based on the memory display format shown in FIG. 11, FIG. 5 shows a unit specification information table, FIG. 6 shows a unit configuration information table, FIG. 13 shows a base information table, and FIG. 21 shows a screen display of a programming device when a program is prepared. In FIG. 21, 30a and 30b are replaced with the memory display format 80 shown in FIG. 11. Other portions are the same as the contents described in relation to Embodiment 4, so that their description is omitted herein.

Figure 23:
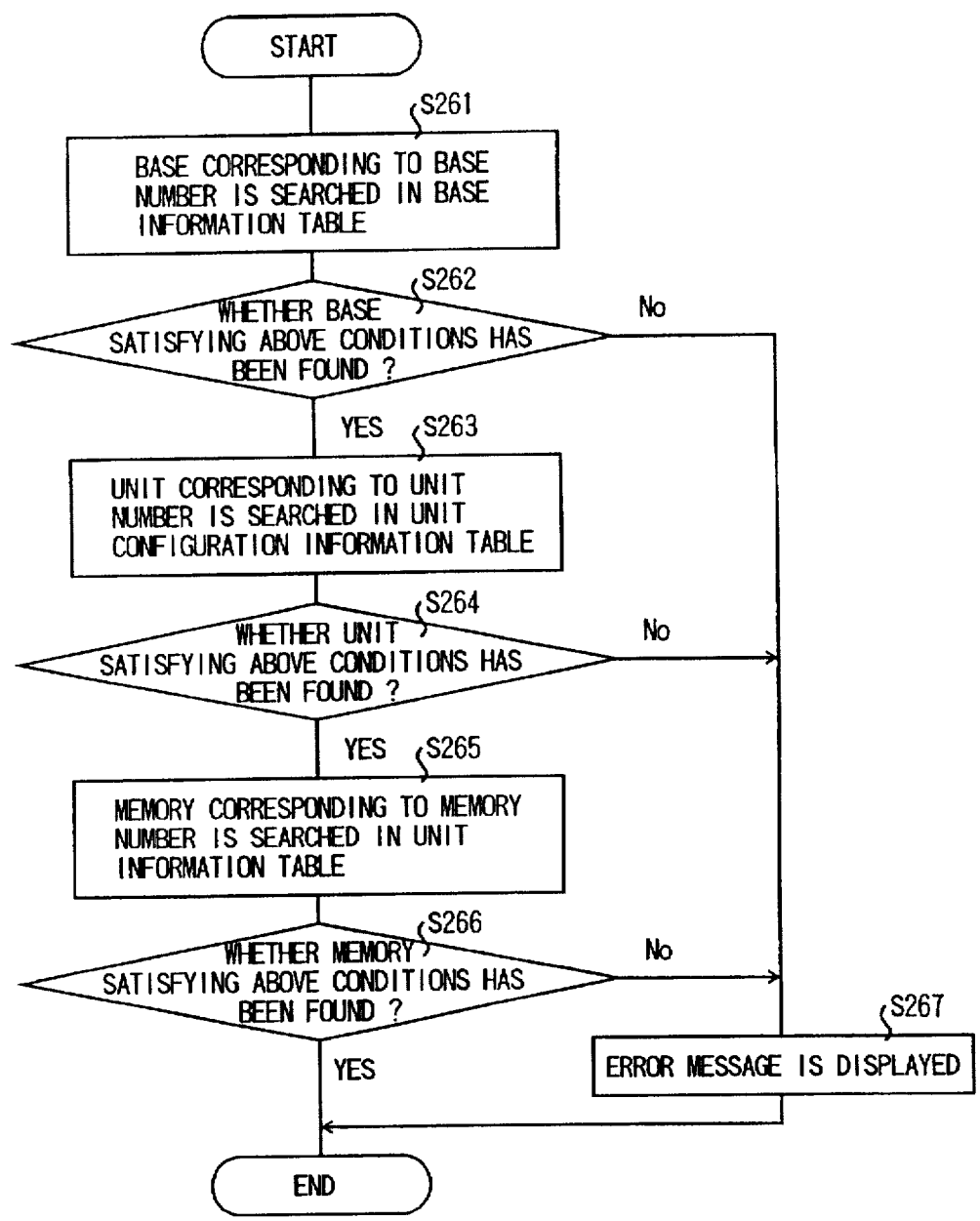
FIG. 23 is a flow chart illustrating processing operations by a program checking device when a program is prepared by a programming device.

FIG. 23 shows a flow chart illustrating processing operations by the program checking means 2' when a program based on the memory display format shown in FIG. 11 is prepared by the programming device according to Embodiment 5, and description is given hereinafter of operations by the program checking means 2' with reference to this flow chart. In this processing, during programming with a programming device, displays for internal memories in a functional unit are inputted by pressing down keys of the input device 6 shown in FIG. 9 and set (The screen 71h shown in FIG. 21 is displayed in the display unit 6 shown in FIG. 9), when an operation for checking the input is executed. In the example of the screen 71h shown in FIG. 21, just immediately after the section 30b is inputted, this section 30b is checked.

In Step S261, to check whether a base corresponding to the unit number 82 exists in the system configuration of a PC among inputted displays for internal memories, a unit number which coincides with the base number 82 is searched in the unit configuration information table. Then the processing shifts to Step S262.

In Step S262, determination as to whether the base satisfying the above conditions has been found by searching in Step S261 above is executed. If it is determined that the base has been found, the processing shifts to Step S262, and if it is determined that the base has not been found, processing shifts to Step S267.

In Step S263, to check whether a unit corresponding to the unit number 32 exists in the system configuration of the PC among displays for input internal memories in a functional unit, a unit number which coincides with the unit number 32 is searched in the unit configuration information table. Then processing shifts to Step S264.

In Step S264, determination as to whether the unit satisfying the above conditions has been found by searching in Step S263 or not is executed. If it is determined that the unit has been found, the processing shifts to Step S265, and if it is determined that the unit has not been found, the processing shifts to Step S267.

In Step S265, to check whether a memory corresponding to the memory type indicated by the memory sign 34 and the memory number 35 exists among input displays for internal memories in a functional unit, the memory number 35 corresponding to the memory sign 34 is searched in the unit configuration information table.

In Step S266, determination as to whether a unit satisfying the above conditions has been found by searching in Step S265 is executed. If it is determined that the unit has been found, it is regarded that there is no abnormality, and processing is finished, and if it is not determined that the unit has not been found, processing goes to Step S267. In Step S267, an error message indicating that a memory indicated by the input display does not exist is provided on a screen of the input device 5 shown in FIG. 5 (Refer to the screen 71*i* shown in FIG. 21), and processing is ended.

Although specific disclosure concerning the preparing means for preparing the unit configuration information table 4 and the base information table 7 is not provided, these tables may be inputted by an user into the programming device 1 based on the system configuration for the PC 22, or may automatically be generated by reading the tables from the PC 22 if the PC 22 is connected to the programming device 1.

As before, the PC 22 is not indispensable for embodying this invention if a user previously inputs the system configuration of the PC 22 into the unit configuration information table 4 and the base information table 7.

Next, a description will be given of Embodiment 6 of the present invention. As for configuration, in FIG. 16 described in relation to Embodiment 3 above, the program preparing means 2 is configured as a program checking means 2' for checking input of a program based on the unit specification information table 3, unit configuration information table 4, and the base information table. In this figure, portions other than the program checking means 2' are the same as in Embodiment 2, so that a further description thereof is omitted.

As described in relation to Embodiment 1, Embodiment 2, Embodiment 3, and Embodiment 4, also in this embodiment, FIG. 17 shows the system configuration of a PC which executes a program prepared by the programming device 1, FIG. 18 shows the format of displays for memories in a functional unit, FIG. 19 shows an example of a program based on the memory display format shown in FIG. 18, FIG. 5 shows a unit specification information table, FIG. 6 shows a unit configuration information table, and FIG. 20 shows a network information table. FIG. 21 shows a screen display of the programming device when a program is prepared, but in this FIG. 30*a* and 30*b* are replaced with the memory display format 85 shown in FIG. 18.

Figure 24:
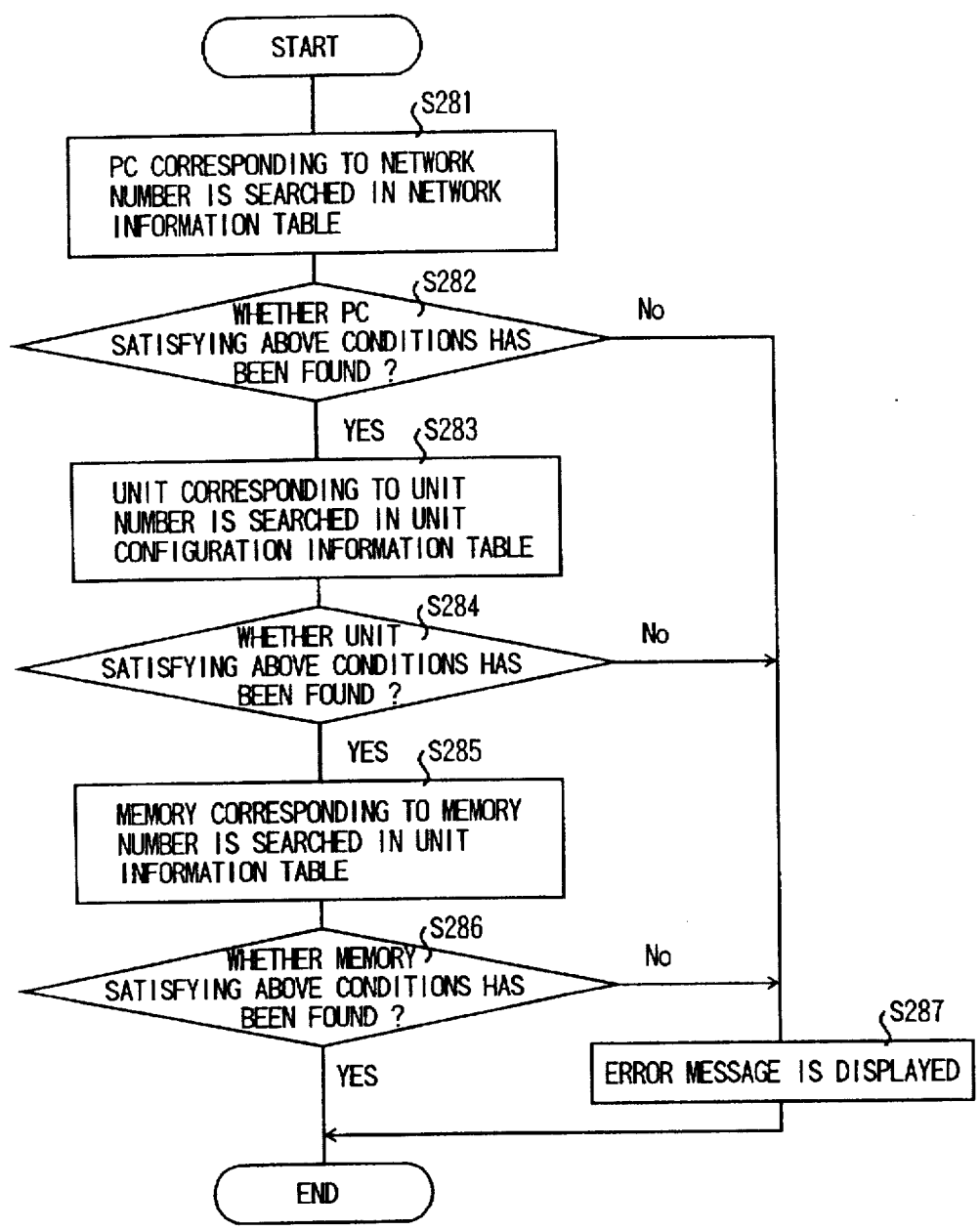
FIG. 24 is a flow chart illustrating processing operations by a program checking device when a program is prepared by a programming device.

FIG. 24 is a flow chart illustrating processing operations by the program checking means when a program based on the memory display format shown in FIG. 18 is prepared by the programming device according to this embodiment, and description is given of the operations of the program checking means 2' according to this embodiment with reference to the flow chart shown in FIG. 24. In this processing, when a program is prepared by a programming device, displays for internal memories in a functional unit are inputted and set by pressing down keys of the input device 6 shown in FIG. 24 (The screen 71*h* shown in FIG. 21 is shown on the display unit 5 shown in FIG. 16), when an operation for checking the input is executed. In the example of screen 71*h* shown in FIG. 21, just immediately after section 30*b* is inputted, this section is checked.

In Step S281, to check whether a base corresponding to the base number 82 exists in the system configuration of the PC, a unit number which coincides with the base number 82 is searched in a unit configuration information table. Then the processing shifts to Step S282.

In Step S282, determination as to whether the base satisfying the above conditions has been found by searching in Step S281 above is executed. If it is determined that the base has been found, processing shifts to Step S283, and on the contrary if it is determined that the base has not been found, the processing shifts to Step S287.

In Step S283, to check whether a unit corresponding to the unit number 32 exists in system configuration of the PC, among input displays for internal memories in a function unit, a unit number which coincides with the unit number 32 is searched in a unit configuration information table. Then the processing shifts to Step S284. In Step S284, determination as to whether the unit satisfying the above conditions has been found by searching in Step S283 is executed. If it is determined that the unit has been found, the processing shifts to Step S285, and if it is determined that the unit has not been found, the processing shifts to Step S287.

In Step S285, to check whether a memory corresponding to the memory type indicated by the memory sign 34 and the memory number 35 exists among input displays for internal memories in a functional unit, the memory number 35 corresponding to the memory sign 34 is searched in a unit configuration information table.

In Step S286, determination as to whether the unit satisfying the above conditions has been found by searching in Step S285 is executed. If it is determined that the unit has been found, it is regarded that there is no abnormality, and the processing is ended. On the contrary, if it is determined that the unit has not been found, processing shifts to Step S287.

In Step S287, an error message indicating that a memory indicated by the input display for internal memories in a functional unit does not exist is displayed on the input screen 5 shown in FIG. 16 (Refer to the screen 71*i* shown in FIG. 21), and processing is ended. As before, tables 4 and 8 may be inputted by a user based on the system configuration of the PC 22 into the programming device 1, or may automatically be generated by reading the tables from the PC 22 if the PC 22 is connected to the programming device 1. The PC 22 is not indispensable if a user inputs the system configuration of the PC 22 into the unit configuration information table 4 and the network information table.

Next, a description is given of Embodiment 7 of the present invention. FIG. 25 shows a functional unit header memory number table in which a header bit memory number of a functional unit based on a functional unit memory display format (Called "the conventional format" hereinafter) not including a section identifying a functional unit mounted in each slot of a PC incorporated in a basic system of a programming device for a PC is stored. Herein the reference numeral 60 indicates a slot number, while reference numeral 61 indicates a unit header memory number.

FIG. 26 is a flow chart illustrating a flow of processing for converting the functional unit memory display format specifying a memory in the functional unit comprising a unit number display section identifying a functional unit shown in FIG. 3 and a memory number display section identifying a memory in a functional unit to the conventional format.

Figure 27:
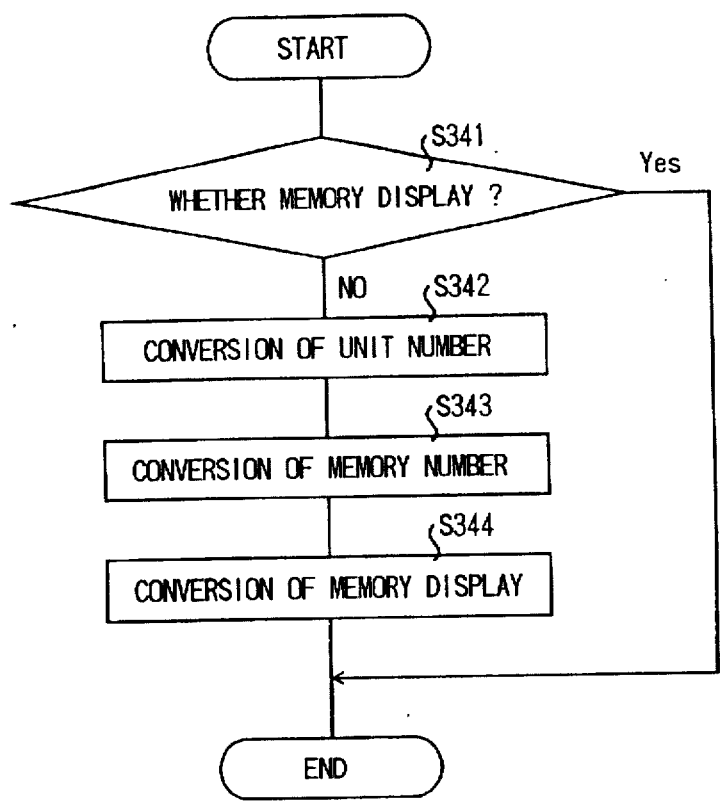
FIG. 27 is a flow chart illustrating processing operations for converting to a functional unit memory display format specifying a memory in a particular functional unit.

FIG. 27 shows a flow chart illustrating processing for converting the conventional format to a functional unit memory display format specifying a memory in a particular functional unit comprising a unit number display section identifying the functional unit shown in FIG. 3 and a memory number display section identifying a memory in a functional unit. It should be noted that, to simplify description, the object for conversion is limited to a memory display in a CPU or a display of memories in a functional unit.

Then description is given of processing for converting a functional unit memory display format identifying a memory in a particular functional unit comprising a unit number display section identifying a functional unit and a memory number display section identifying a memory in a functional unit to the conventional format with reference to the flow chart shown in FIG. 26.

In Step S321, to make a determination as to whether a memory display to be converted is a display for memories in a functional unit or not, determination as to whether the memory sign is "U" or not is executed. As a result, if it is determined that the memory sign is "U", the processing shifts to Step S322, and on the contrary if it is determined that the memory sign is not "U", the processing is ended.

Figure 38:
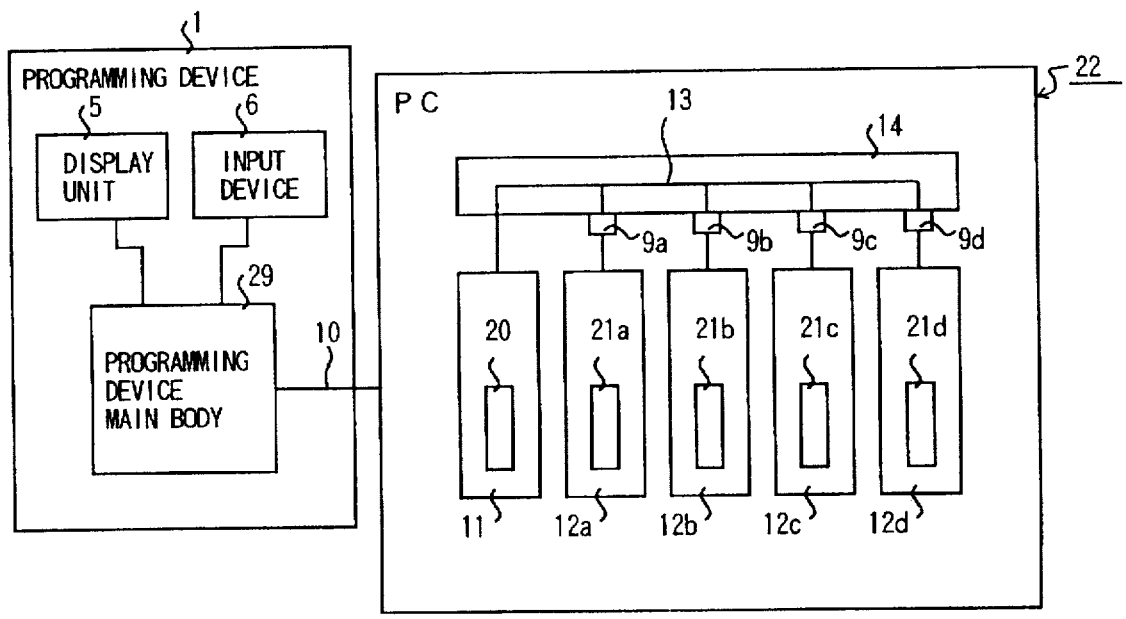
FIG. 38 is a block diagram illustrating the configuration of a conventional programming device.
Figure 39:
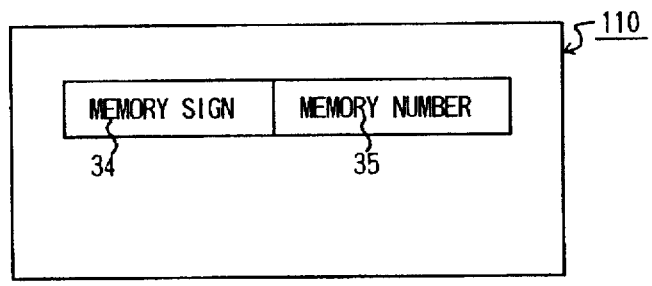
FIG. 39 is an explanatory view illustrating an example of display format of a conventional input or output bit memory.
Figure 40:
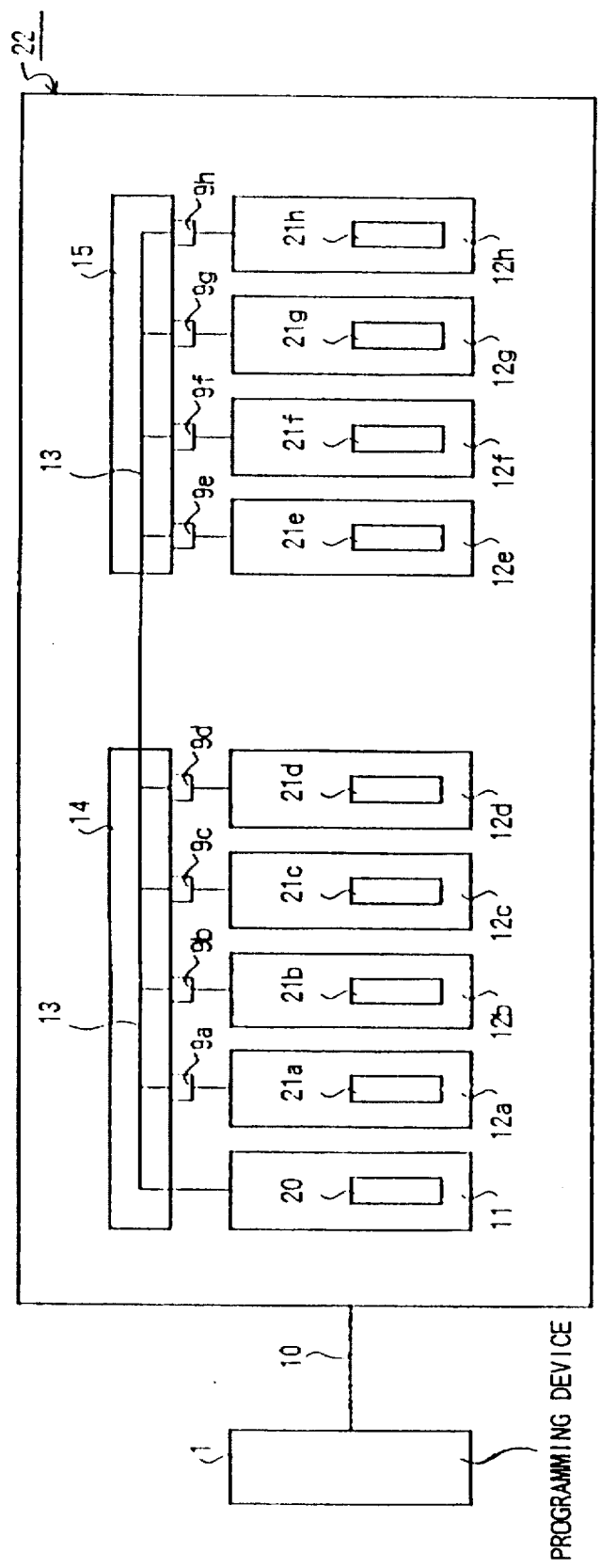
FIG. 40 is a block diagram illustrating another configuration of a PC.

In Step S322, a unit header memory number table is searched by using a unit number as a key. A unit header memory number for a slot number which coincides with the unit number is read out. In Step S323, the memory number (unit header memory number+memory number) is computed. Furthermore in Step S324, the memory display 110 shown in FIG. 38 is prepared from the memory sign and the memory number.

Next description is given for processing for converting the conventional format to the functional unit memory display format specifying a memory in a particular unit comprising a unit number display section identifying a functional unit and a memory number display section identifying a memory in a functional unit with reference to the flow chart shown in FIG. 27.

In Step S341, determination as to whether a memory display to be converted is a memory inside a CPU is made from the memory sign. As a result, if it is determined that the memory is a memory inside the CPU, the processing is ended. On the contrary, if it is determined that the memory is not inside the CPU, the processing shifts to Step S342.

In Step S342, a unit header memory number table is searched by using the memory number as a key. This retrieval is for searching a memory having a unit header memory number smaller than the memory number in the reverse direction from the end of the unit header memory table. This slot number is used as a unit number.

In Step S343, a memory number is computed from the unit header memory number searched in Step S342. In Step S344, the memory display 30 shown in FIG. 3 is prepared by the unit number computed in Step S342 and the memory number computed in Step S343.

The preparing means for preparing the unit configuration information table 4 may be inputted by a user into the programming device 1 based on the system configuration of PC 22, or may automatically be generated by reading the table from the PC 22 if the PC 22 is connected to the programming device 1. In the present invention, the PC 22 is not indispensable, and the same effect can be achieved on the condition that a user previously inputs the system configuration of the PC 22 into the unit configuration information table 4.

Next, a description is given of Embodiment 8 of the present invention. FIG. 28 shows a functional unit header memory number table in which a header bit memory number of a functional unit mounted in each slot of a PC incorporated in the basic system of a programming device for a PC based on the conventional type of format is stored. Unit numbers in this figure are assigned to units from that closest to the CPU, and serial numbers successive to those used for those in the CPU are used as unit numbers in an extended base section.

Figure 30:
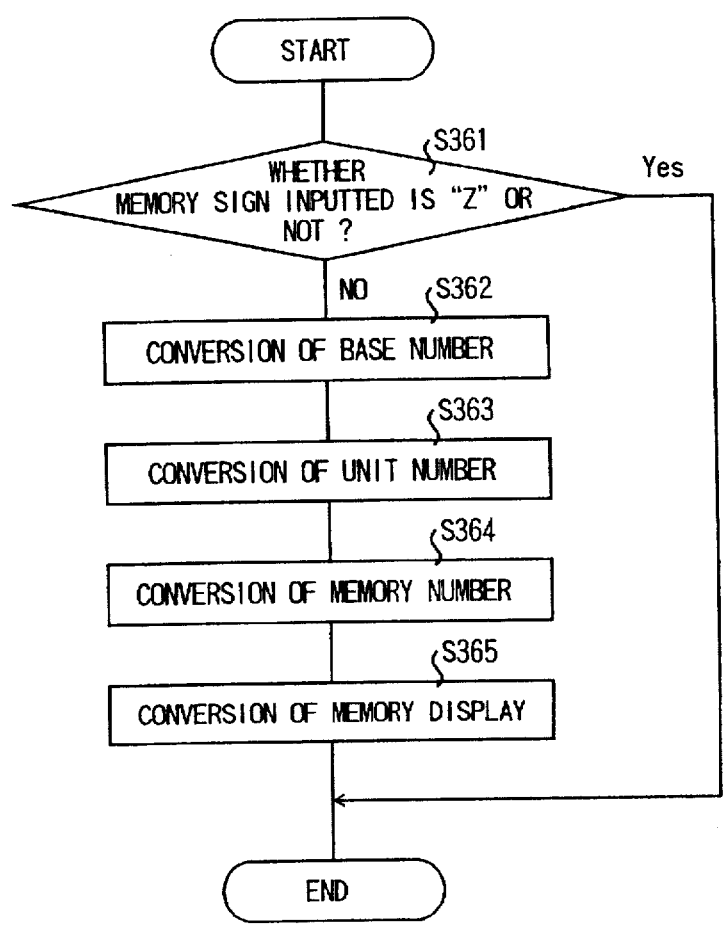
FIG. 30 is a flow chart illustrating processing operations for converting a functional unit memory display format specifying a memory in a particular functional unit to a conventional format.

FIG. 29 shows a base header unit number table in which header unit numbers for units mounted in a base and an extended base incorporated in the basic system of a programming device for a PC like the functional unit header memory number table are stored. The way of numbering is the same as that shown in FIG. 28 above. FIG. 30 is a flow chart illustrating the processing for converting a functional unit memory display format specifying a memory in a functional unit comprising a base number display section identifying the base section shown in FIG. 11, a unit number display section identifying a functional unit, and a memory number display section identifying memory in a functional unit, to the conventional format.

Figures 31, 32:
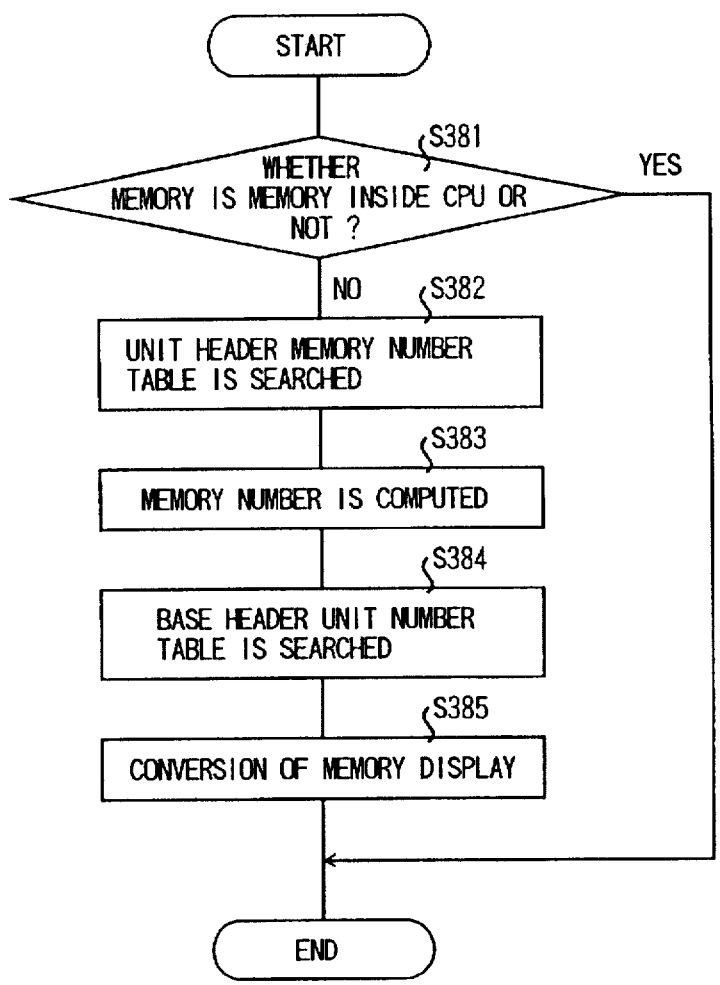
FIG. 31 is a flow chart illustrating processing operations for converting to a functional unit memory display format specifying a memory in a particular functional unit.
FIG. 32 is an explanatory view illustrating a network header memory number table in which a header number of a network memory is stored.

FIG. 31 is a flow chart illustrating a flow of processing for converting the conventional format to a functional unit memory display format specifying a memory in a functional unit comprising a base number display section identifying the base section shown in FIG. 11, a unit number display section identifying a functional unit, and a memory number display section identifying memory in a functional unit.

Description is given for the flow of processing for converting a functional unit memory display format specifying a memory in a functional unit comprising a base number display section identifying a base section, a unit number display section identifying a functional unit, and a memory number display section identifying memory in a functional unit to the conventional format with reference to the flow chart shown in FIG. 30. It should be noted that, to simplify the description, the object to be converted is limited to a display for memories in a CPU or that for memories in a functional unit.

In Step S361, determination as to whether the memory sign is "Z" or not is executed to determine whether the display is a memory display for a functional unit or not. If it is determined that the memory sign is "Z", the processing shifts to Step S362, and on the contrary, if it is determined that the memory sign is not "Z", the processing is terminated.

In Step S362, a base header unit number table is searched using a base number as a key. A base header unit number of a base number which coincides with a base number is read out. In Step S363, the unit header memory number table is searched by using the base header unit number obtained in Step S363 above+a unit number as a key. A unit header memory number of a slot number which coincides with the unit number is read out.

In Step S364, a memory number is computed from the unit header memory number +a unit number obtained in Step S363. In Step S365, the memory display 110 shown in FIG. 38 is prepared from the memory sign as well as the memory number.

The flow of processing for converting a functional unit memory display format not including a section identifying a base section or the like to a functional unit memory display format specifying a memory in a particular functional unit comprising a base number display section identifying a base section, a unit number display section identifying a functional unit, and a memory number display section identifying a memory in a functional unit is described with reference to the flow chart shown in FIG. 31.

In Step S381, determination as to whether the memory is a memory inside a CPU is executed from the memory sign. As a result, if it is determined that the memory is inside a CPU, the processing is ended. On the contrary, if it is determined that the memory is not inside the CPU, the processing shifts to Step S382.

In Step S382, a unit header memory number table is searched by using a memory number as a key. This operation searches a memory having a unit header memory number smaller than the memory number in the reverse direction from the end of the unit header memory number table. The slot number corresponding to this unit header memory number is used as a unit number. Also in Step S383, a memory number is computed from the unit header memory number searched in Step S382 above.

In Step S384, a base header unit number table is searched by using a unit number corresponding to the unit header memory number obtained in Step S382 as a key. In this operation, a memory having a base header unit number smaller than the unit number is searched in the reverse direction from the end of the base header unit number table. A base number corresponding to this base header unit number is used as a base number. Then, a unit number is obtained from a unit number (base header unit number) corresponding to the unit header memory number obtained in Step S382 above.

In Step S385, the memory display 80 shown in FIG. 11 is prepared from the base number and unit number obtained in Step S384 above as well as from the memory number obtained in Step S383 above. Tables 4 and 7 may be inputted by a user into the programming device 1 based on the system configuration of the PC 22, or may automatically be generated by reading the tables from the PC 22 if the PC 22 is connected to the programming device 1. If the PC 22 is not connected, the same effect can be achieved if the user previously inputs the system configuration of the PC 22 into the unit configuration information table 4 and the base information table 7.

Embodiment 9 of the present invention is now described. FIG. 32 shows a network header memory number table in which a header number of a network memory based on a network memory display format not including a section identifying a network allocated to each PC, and incorporated in the basic system of a programming device, is stored.

As described in relation to the conventional technology, assignment of a memory number is the same as that for bit memories inside a functional unit. For this reason, conversion of a display format can be executed by using the network header memory number table shown in FIG. 30 as in the case of the functional unit described in embodiment 7 above, so that description of the processing flow is omitted herein. Tables 4 and 8 may be inputted by a user into the programming device 1 based on the system configuration of the PC 22, or may automatically be generated by reading the tables from the PC 22 if the PC 22 is connected to the programming device. If no PC 22 is connected, the same effect can be achieved if the user previously inputs the system configuration of the PC 22 into the unit configuration information table 4 and the network information table 8.

Figure 33:
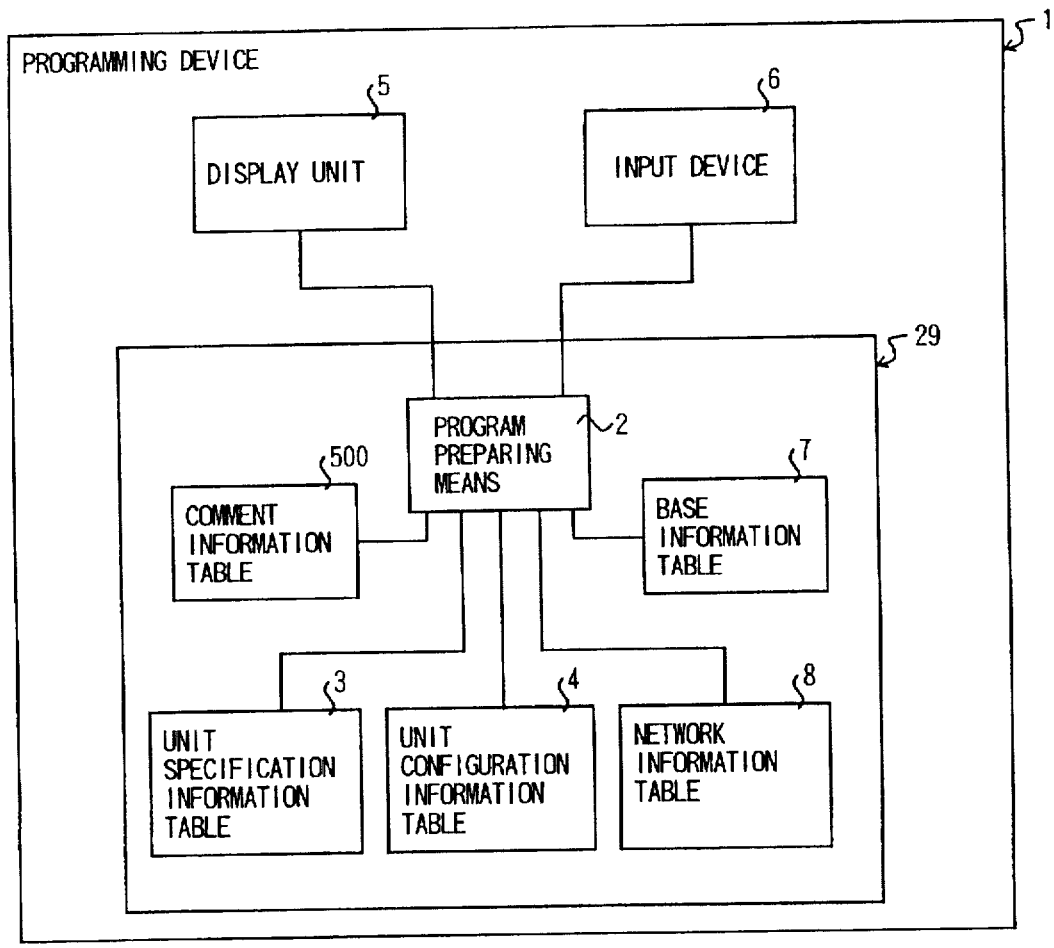
FIG. 33 is a block diagram illustrating another configuration of a programming device.

Next, a description is given of Embodiment 10. FIG. 33 shows the configuration of a programming device. In this figure, reference numeral 500 indicates a comment information table in which comments for default, corresponding to each sign as well as to each number, are stored. Reference numerals 1 to 8 are the same as those in the embodiments above, so their description is omitted herein.

Figure 34:
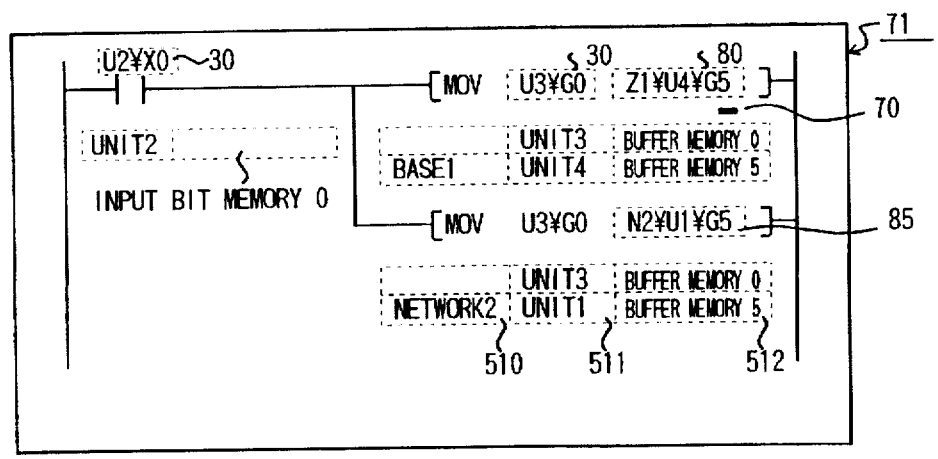
FIG. 34 is an explanatory view illustrating a case where comments corresponding to a base sign and a base number or the like are written.

In FIG. 34, comments described in a program for a PC corresponding to a base sign as well as a base number, each identifying a base section in which a functional unit is mounted and connected to, a network sign as well as a network number each identifying a network to which the functional unit is connected, a unit sign as well as a unit number each identifying the functional unit, and a memory sign as well as a memory number each identifying a memory in a functional unit are shown.

In FIG. 34, reference numeral 70 is a current program input position, 71 is a screen of a programming device, 30 is a display of a memory in a functional unit, 80 is a display of a memory in a functional unit with a base display, 85 is a memory display for other PCs connected through a network, 510 is a comment corresponding to a base sign and a base number, or a network sign and a network number, 511 is a comment corresponding to a unit sign and a unit number, and at 512 is a comment corresponding to a memory sign and a memory number in a functional unit.

Figure 35:
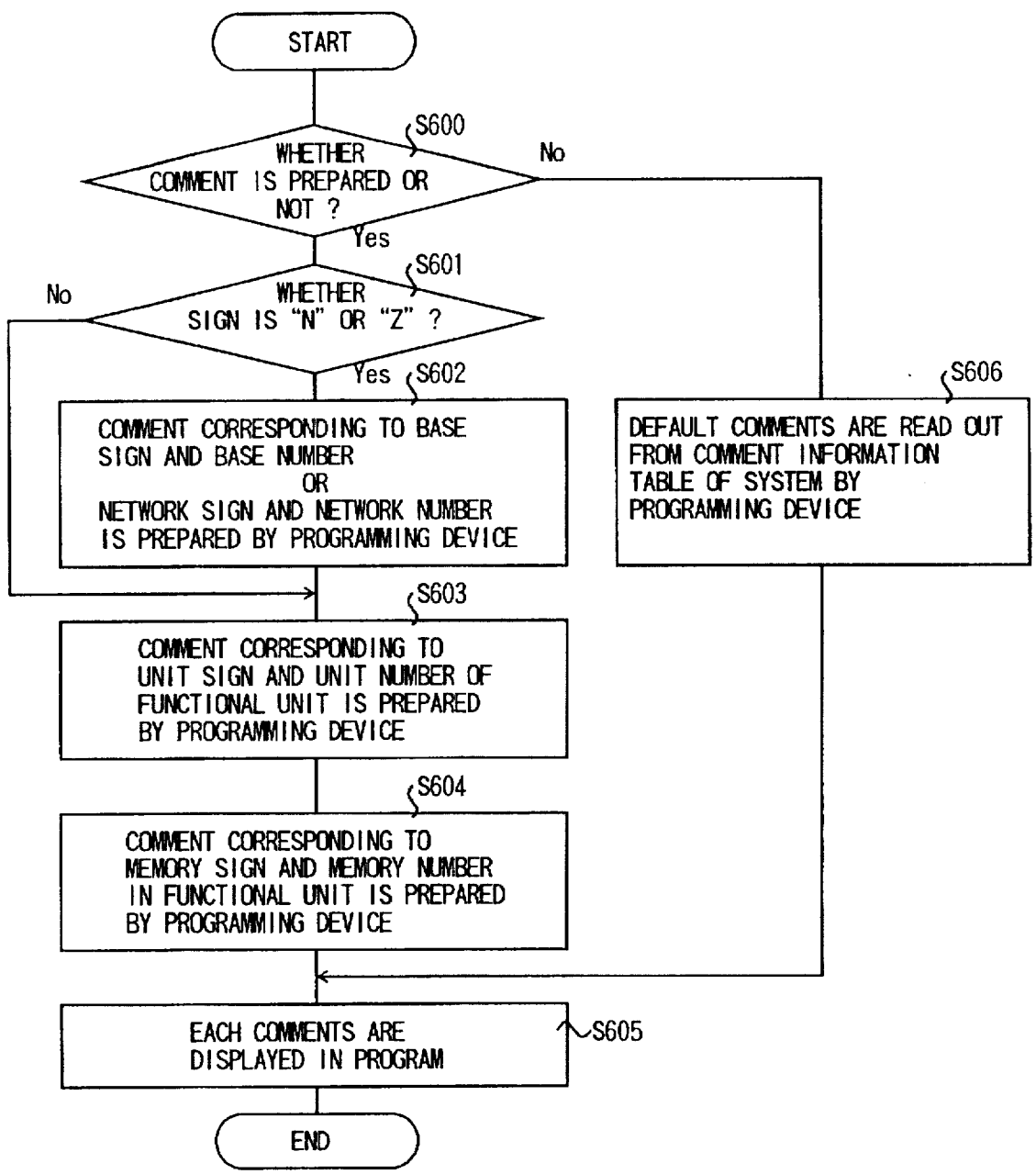
FIG. 35 is a flow chart illustrating processing operations for preparing, reading, and writing in a program comments corresponding to a base sign and a base number or the like with a programming device for a PC.

FIG. 35 is a flow chart illustrating the processing for preparing or reading, with a programming device, and writing in a program for a PC. The written comments include comments corresponding to a base sign as well as a base number, each identifying a base section in which a functional unit is mounted and connected to, a network sign as well as a network number each identifying a network to which the functional unit is connected, a unit sign as well as a unit number each identifying a functional unit, and a memory sign as well as a memory number each identifying a memory in the functional unit, entered during an operation for programming for a PC.

Next, a description is given of operations according to Embodiment 10 of the present invention with reference to the flow chart shown in FIG. 35 described above. At first, when an input of a comment is instructed in association with a key input from the input device shown in FIG. 33, in Step S600, and then comment input processing for memory displays of a cursor position on the display unit shown in FIG. 33 is started, then the key code first inputted from the input device after start of the processing is identified. Determination is then made as to whether a comment corresponding to each sign and each number should be prepared with the programming device 1, or a default comment should be read from a system in a programming device. In a case where the key code is a carriage return key for setting the input data, operation goes to step S606. Otherwise, determination is made as to the type of sign for object memory display used for preparation of a comment in Step S601. When the type of sign is a base sign or a network sign, a comment corresponding to each sign and number is prepared from the comment data inputted from the input device 6 shown in FIG. 33 in Step S602.

Then in Step S603, a comment corresponding to a unit sign as well as a unit number in a functional unit is prepared from the comment data inputted from the input device shown in FIG. 33. Furthermore, in Step S604 in the screen of the input device shown in FIG. 33, a comment corresponding to a memory sign as well as a memory number each identifying a memory in the functional unit is prepared.

At last, in Step S605, a comment corresponding to a base sign as well as a base number, or to a network sign as well as a network number, is displayed at 510 in FIG. 34, a comment corresponding to a unit sign as well as a unit number in the functional unit is displayed at 511 in FIG. 54, and a comment corresponding to a memory sign as well as a memory number in the functional unit is displayed at 512 in FIG. 34. On the contrary, if it is determined that a comment should not be prepared, in Step S606, default comments each corresponding to each sign as well as each number are read from a comment information table in the programming device 1, and in Step S605, the comments are displayed in a program on the screen of the display unit shown in FIG. 33.

Figure 36:
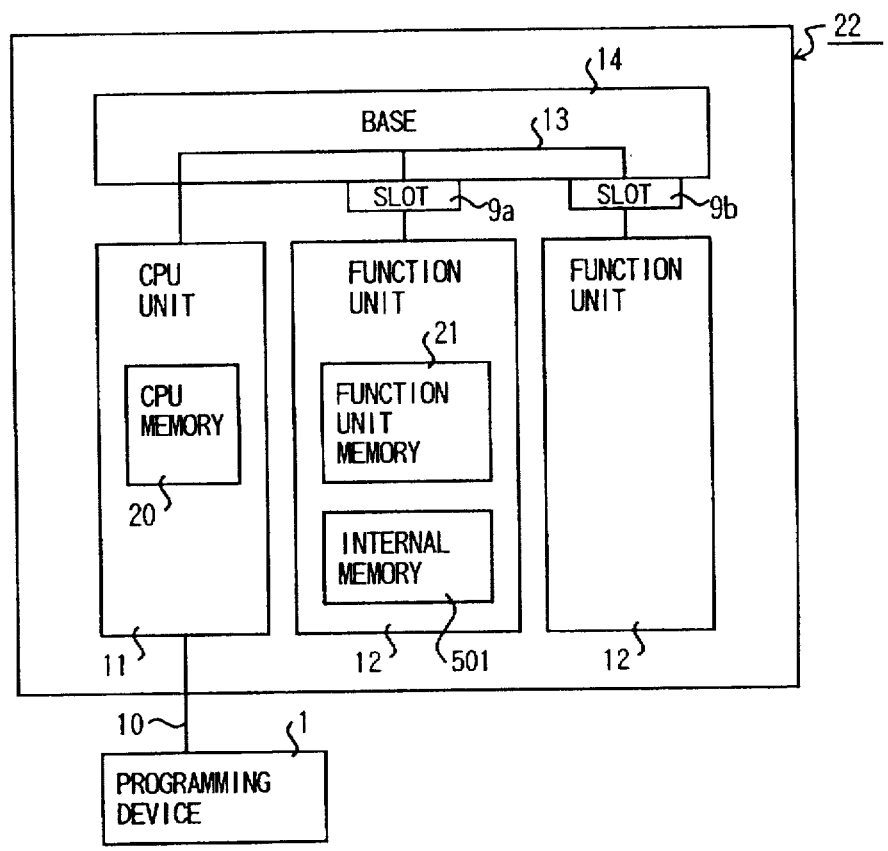
FIG. 36 is a block diagram illustrating the system configuration of a PC which executes a program prepared by a programming device.
Figure 37:
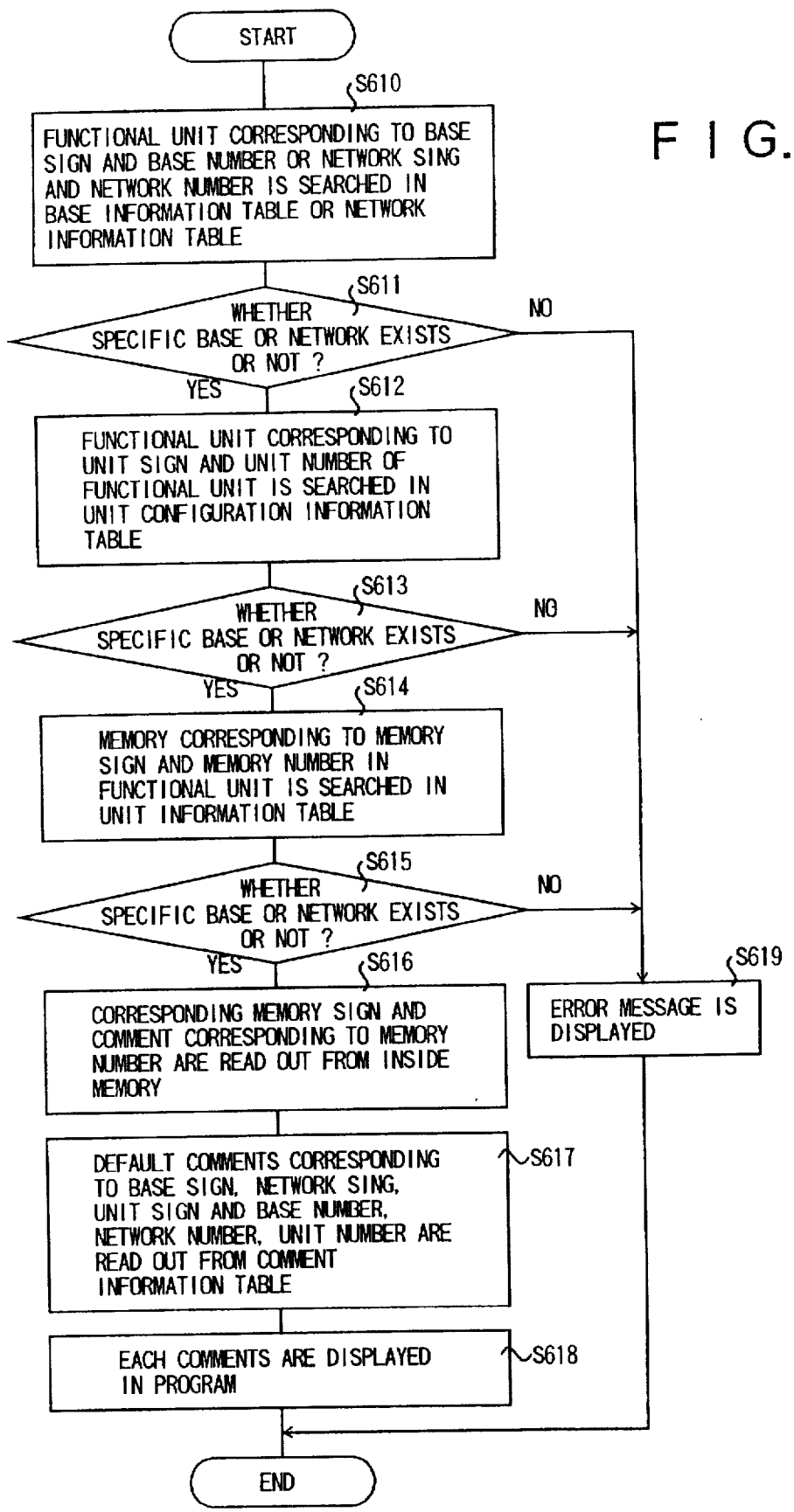
FIG. 37 is a flow chart illustrating processing operations for reading comments corresponding to a base sign, a base number or the like from a CPU and writing the comments in a PC with a programming device.

Next, a description is given of Embodiment 11. FIG. 36 shows the system configuration of a PC which executes a program prepared by the programming device 1. In this figure reference numeral 501 indicates an internal memory in which unit information for a functional unit is stored. Other portions are the same as the contents of FIG. 2 described in relation to Embodiment 1 above, so that the description is omitted. FIG. 37 shows a flow chart of the processing for reading out with a programming device from a CPU and writing in a program for a PC comments corresponding to a base sign as well as a base number, each identifying a base section in which a functional unit is mounted and connected to, a network sign as well as a network number each identifying a network to which the functional unit is connected, a unit sign as well as a unit number each identifying the functional unit, and a memory sign as well as a memory number each identifying a memory in the functional unit, during an operation for programming the PC.

Operations in this embodiment are described with reference to the flow chart shown in FIG. 37. At first, in Step S610, the base information table 7 and the network information table 8 are searched to make a determination as to whether a functional unit corresponding to a base sign and a base number or to a network sign and a network number each specified with the programming device 1 exists or not. Next, in Step S611, determination is made as to whether the specified base or network exists or not, and if it is determined that the specified base or network exists, in Step S612, the unit configuration information table 4 is searched to make a determination as to whether a unit sign and a unit number each identifying a functional unit exists.

Then in Step S613, determination as to whether the specified unit exists is executed, and if it is determined that the specified unit exists, furthermore in Step S614 the unit specification information table 3 is searched to make a determination as to whether a memory sign and a memory number in the specified functional unit exists. Then in Step S615, determination as to whether a memory sign and a memory number in the specified functional unit exists is executed, and if it is determined that the memory sign and the memory number exist, then in Step S616, a comment corresponding to the memory sign and the memory sign in the functional unit is read from an internal memory 501 in a functional unit 12 through a communication table and a CPU unit 11.

At last, in Step S617, default comments corresponding to each base, network, unit signs and numbers respectively are read from a comment information table in a programming device, and displayed together with the comments read from the functional unit 12 in a program being displayed on the screen of the display unit of the programming device shown in FIG. 36. In each of the steps S611, S613, and S615 above, if it is determined that the specified base, network, and unit do not exist, an error message is displayed in Step S619 on the screen of the display unit of the programming device shown in FIG. 36, and the processing is terminated.

As described above, in a programming device for a PC according to the present invention, a program preparing means provides information concerning internal memories in a functional unit incorporated in an object PC as a guidance display on a screen based on the unit information and unit configuration information, so that a program prepared by the programming device is easy to understand and the productivity as well as the readability of the program prepared by the programming device is improved.

In a programming device for a PC according to the present invention, a programming preparing means provides information concerning internal memories in a functional unit incorporated in an object PC as a guidance display on a screen based on the unit information, unit configuration information, and base information, so that a program prepared by the programming device is easy to understand and the productivity as well as the readability of a program prepared by the programming device is improved.

In a programming device according to the present invention, a program preparing means produces information on other PCs connected through a network as a guidance display on a screen based on the network information, so that the correspondence between PCs actually connected through the network and memory displays dedicated to the network are easier to understand.

In a programming device according to the present invention, a programming checking means checks whether an object PC has displays for internal memories in a functional unit included in an inputted program based on the unit information and unit configuration information, so that the contents of a program prepared by the programming device are easy to understand and the productivity as well as the readability of a program prepared by the programming device is improved.

In a programming device according to the present invention, a program checking means checks whether an object PC has displays for internal memories in a functional unit included in an inputted program based on the unit information, unit configuration information, and base information, so that the contents of a program prepared by the programming device is easy to understand and the productivity as well as the readability of a program prepared by the programming device is improved.

In a programming device according to the present invention, a program checking means makes a determination as to whether other PCs have displays for internal memories in other PCs connected through a network included in a program inputted based on the network information, so that correspondence between actual PCs connected through a network and memory displays dedicated to the network are easy to understand, and internal memories in a functional unit and those in other PCs connected through a network can be treated with the same commands.

In a programming device according the present invention, a memory display format converting means converts a functional unit memory display format specifying a memory in a particular functional unit comprising a unit number display section identifying a functional unit and a memory number display section identifying a memory in a functional unit to a functional unit memory display format not including a section identifying a functional unit or vice versa, so that the contents of a program prepared by the programming device is easy to understand and the productivity as well as the is readability of a program prepared by the programming device is improved.

In a programming device according to the present invention, a memory format converting means converts a functional unit memory display format specifying a memory in a particular functional unit comprising a base number display section identifying a base section, a unit number display section identifying a functional unit, and a memory number display section identifying a memory in a functional unit to a functional unit memory display format not including a section identifying a base section nor a functional unit, so that the contents of a program prepared by the programming device are easy to understand and the productivity as well as the readability of a program prepared by the programming device is improved.

In a programming device for a PC according to the present invention, a memory display format converting means converts a network memory display format comprising a network number display section identifying other PCs connected to a communications network and a memory display section for said other PCs to a functional unit memory display format not including a network number display section or vice versa, so that the contents of a program prepared by the programming device are easy to understand and the productivity as well as the readability of a program prepared by the programming device are improved.

In a programming device for a PC according to the present invention, a comment processing means prepares, selects, and displays on a screen comments corresponding to a unit sign as well as a unit number each identifying a functional unit, and to a memory sign as well as a memory number each identifying a memory in a functional unit, so that displays for internal memories in a functional unit can easily be inputted, contents of the program prepared by the programming device are easy to understand, and the productivity as well as the readability of a program prepared by the programming device are improved.

In a programming device for a PC according to the present invention, a comment storing means stores comments corresponding to a unit sign as well as a unit number each identifying a functional unit and a memory sign as well as a memory number each identifying a memory in a functional unit, so that displays for internal memories in a functional unit can easily be inputted, contents of a program prepared by the programming device are easy to understand, and the productivity as well as the readability of a program prepared by the programming device are improved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A programming device for a programmable controller comprising:
    a CPU unit controlling a program;
    functional units having a bidirectional memory accessible from said CPU unit and providing specific controls according to instructions from said CPU unit;
    a unit specification information section in which specifications of each of said functional units are set;
    a unit configuration information section in which configurations of said functional units are set; and
    a program preparing means comprising means responsive to user input to cause a CRT to display a selection menu containing configuration information and specification information, and for decoding a user selection from said menu to obtain a program code corresponding to said selection and to display said program code at a code entry Position on said CRT.

2. A programming device for a programmable controller according to claim 1, comprising:
    a header memory number storing section in which header memory numbers for each functional unit mounted in each slot for said programmable controller are stored; and
    a memory display format converting means for converting a functional unit memory display format specifying a memory in a particular unit comprising a unit number display section identifying a functional unit and a memory number display section identifying a memory in said functional unit to a functional unit memory display format not including a section identifying a functional unit by using a header memory number of a functional unit storing in said header memory number storing section or vice versa.

3. A programmable device for a programmable controller according to claim 1, wherein said functional unit comprises a comment information processing means for preparing comments corresponding to a network sign as well as a network number each identifying a connected thereto, a base sign as well as a base number each identifying base section in which a functional unit is mounted and connected thereto a unit sign as well as a unit number each identifying a functional unit, and a memory sign as well as a memory number each identifying a memory in a functional unit, or selecting and displaying a comment previously set.

4. A programming device for a programmable controller comprising:
    a CPU unit controlling a program;
    a functional unit having a bidirectional memory accessible from said CPU unit and providing specific controls such as input, output or analog control, positioning control, communication control, and monitor display control according to instructions from said CPU unit;
    a base section in which said CPU unit and said functional unit are mounted and connected thereto;
    an extended base section for extending said base section;
    a unit specification section in which specifications of said functional unit are set;
    a unit configuration information section in which combinations of said functional units are set;
    a base information section in which configuration of said base section is set; and
    a program preparing means for assisting input of a program for a programmable controller according to various types of information in said unit specifications information section, unit configuration information section, and base information section.

5. A programming device for a programmable controller according to claim 4, comprising:
    a header memory number storing section in which header memory numbers for each functional unit mounted in each slot for said programmable controller are stored;
    a base header unit number storing section in which header unit numbers for units mounted in said base section and extended base section are stored; and
    a memory display format converting means for converting a functional unit memory display format specifying a memory in a functional unit comprising a base number display section identifying said functional unit, a unit number display section identifying said functional unit, and a memory number display section identifying a memory in a functional unit by using a header memory number of a functional unit storing in said header memory number storing section to a functional unit memory display section not including a section identifying a base section and a functional unit or vice versa.

6. A programming device for a programmable controller which reads and writes information on memories in other programmable controllers through a communications network comprising:

a CPU unit controlling a program;

a functional unit having a bidirectional memory accessible from said CPU unit and providing specific controls such as input, output or analog control, positioning control, communication control, and monitor display control according to instructions from said CPU unit;

a unit specification information section in which specifications of said functional unit are set;

a unit configuration information section in which combinations of said functional units are set;

a network information section in which types of other programmable controllers connected to said communications network are set; and a program preparing means for assisting input of a program for a programmable controller according to various types of information in said unit specification information section, unit configuration information section and network information section.

7. A programming device for a programmable controller according to claim 6, comprising:

a network information storing section in which types of other programmable controllers connected to said communications network are set; and a memory display format converting means for converting a network memory display format comprising a network number display section identifying other programmable controller connected to said communication s network and a memory display section for said other programmable controller to a functional unit memory display format not including a network number display section or vice versa.

8. A programming device for a programmable controller comprising:

a CPU unit controlling a program;

a functional unit having a bidirectional memory accessible from said CPU unit and providing specific controls such as input, output or analog control, positioning control, communication control, and monitor display control according to instructions from said CPU unit;

a unit specification information section in which specifications of said functional unit are set;

a unit configuration information section in which combinations of said functional units are set; and a program checking means for checking a program for a programmable controller according to various type of information in said unit specification information section and unit configuration information section.

9. A programming device for a programmable controller comprising:

a CPU unit controlling a program;

a functional unit having a bidirectional memory accessible from said CPU unit and providing specific controls such as input, output or analog control, positioning control, communication control, and monitor display control according to instructions from said CPU unit;

a base section in which said CPU unit and functional unit are mounted and connected thereto;

an extended base section for extending said base section;

a unit specification information section in which specifications of said functional unit are set;

a unit configuration information section in which combinations of said functional units are set;

a base information section in which configuration of said base section is set; and a program checking means for checking a program for a programmable controller according to various types of information in said unit specification information section, unit configuration information section and base information section.

10. A programming device for a programmable controller which reads and writes information on memories in other programmable controllers through a communications network, comprising:

a CPU unit controlling a program;

a functional unit having a bidirectional memory accessible from said CPU unit and providing specific controls such as input, output or analog control, positioning control, communication control, and monitor display control according to instructions from said CPU unit;

a unit configuration information section in which specifications of said functional unit are set;

a unit configuration information section in which combinations of said functional units are set;

a network information section in which types of other programmable controllers connected to said communications network are set; and a program checking means for checking input of a program for a programmable controller according to various types of information in said unit specification information section, unit configuration information section and network information section.

11. A functional unit for a programmable controller having a bidirectional memory accessible from a CPU unit controlling a program and providing specific controls such as input, output or analog controls, positioning control, communication control, and monitor display control according to instructions for said CPU unit, wherein said function unit has a comment information storing means for storing comments corresponding to a network sign as well as a network number each identifying a network to which said functional unit is connected, a base sign as well as a base number each identifying a base section in which a functional unit is mounted and connected thereto, a unit sign as well as a unit number each identifying a function unit, and a memory sign as well as a memory number each identifying a memory in a functional unit.

12. A method of inputting memory displays for a programming device, comprising the steps of:

a first step for making a determination as to whether a predetermined sign has been input by a user;

a second step for displaying a unit configuration menu based on system configuration of an object PC upon detection of said sign;

a third step for reading data on specifications of a unit member selected from the unit configuration menu displayed is said second step and displaying on the screen a memory select menu based on said data; and a fourth step for assembling an internal memory displays in the functional unit based on the unit number selected in said second step, the memory type and memory number in the memory select menu displayed in said third step.

* * * * *